(12) United States Patent
Ghouti et al.

(10) Patent No.: US 8,331,558 B2
(45) Date of Patent: Dec. 11, 2012

(54) METHOD OF CIPHER BLOCK CHAINING USING ELLIPTIC CURVE CRYPTOGRAPHY

(75) Inventors: Lahouari Ghouti, Dhahran (SA); Mohammad K. Ibrahim, Leicester (GB); Adnan A. Gutub, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 484 days.

(21) Appl. No.: 12/656,897

(22) Filed: Feb. 18, 2010

(65) Prior Publication Data

US 2011/0200186 A1 Aug. 18, 2011

(51) Int. Cl.
*H04L 9/28* (2006.01)
*H04L 9/30* (2006.01)
*H04K 1/02* (2006.01)

(52) U.S. Cl. .............................. 380/30; 380/28; 380/43

(58) Field of Classification Search .................... 380/28, 380/30, 43
See application file for complete search history.

(56) References Cited

U.S. PATENT DOCUMENTS

| | | | |
|---|---|---|---|
| 4,200,770 A | 4/1980 | Hellman et al. | |
| 4,424,414 A | 1/1984 | Hellman et al. | |
| 4,668,103 A | 5/1987 | Wilson | |
| 4,995,082 A | 2/1991 | Schnorr | |
| 5,010,573 A | 4/1991 | Musyck et al. | |
| 5,054,066 A | 10/1991 | Riek et al. | |
| 5,146,500 A | 9/1992 | Maurer | |
| 5,150,411 A | 9/1992 | Maurer | |
| 5,272,755 A | 12/1993 | Miyaji et al. | |
| 6,816,594 B1 | 11/2004 | Okeya | |
| 6,876,745 B1 | 4/2005 | Kurumatani | |
| 7,308,469 B2 | 12/2007 | Harley et al. | |
| 7,319,751 B2 | 1/2008 | Kirichenko | |
| 7,483,533 B2 | 1/2009 | Ibrahim | |
| 7,483,534 B2 | 1/2009 | Ibrahim | |
| 7,961,873 B2 * | 6/2011 | Ibrahim | 380/28 |
| 7,961,874 B2 * | 6/2011 | Ibrahim | 380/28 |
| 8,139,765 B2 * | 3/2012 | Ghouti et al. | 380/28 |
| 2003/0072443 A1 | 4/2003 | Harley et al. | |
| 2003/0108196 A1 | 6/2003 | Kirichenko | |
| 2004/0091105 A1 | 5/2004 | Kim et al. | |
| 2004/0223609 A1 | 11/2004 | Wu | |

(Continued)

FOREIGN PATENT DOCUMENTS

EP 0874307 10/1998

(Continued)

OTHER PUBLICATIONS

Chevassut, Olivier et al. "The Twist-AUgmented Technique for Key Exchange", 2006.*

(Continued)

*Primary Examiner* — Michael Simitoski
(74) *Attorney, Agent, or Firm* — Richard C. Litman

(57) ABSTRACT

The method of cipher block chaining using elliptic curve cryptography allows for the encryption of messages through elliptic curve cryptography and, particularly, with the performance of cipher block chaining utilizing both the elliptic curve and its twist, regardless of whether the elliptic curve and its twist are isomorphic with respect to one another. The method of performing elliptic curve cryptography is based on the elliptic curve discrete logarithm problem. It is well known that an elliptic curve discrete logarithm problem is a computationally "difficult" or "hard" problem.

6 Claims, 1 Drawing Sheet

U.S. PATENT DOCUMENTS

| | | | |
|---|---|---|---|
| 2006/0029220 A1 | 2/2006 | Ibrahim | |
| 2006/0029221 A1 | 2/2006 | Ibrahim | |
| 2008/0080710 A1 | 4/2008 | Harley et al. | |
| 2008/0165955 A1* | 7/2008 | Ibrahim | 380/30 |
| 2008/0215658 A1 | 9/2008 | Gura et al. | |
| 2008/0260143 A1* | 10/2008 | Ibrahim | 380/28 |
| 2009/0136022 A1 | 5/2009 | Langendoerfer et al. | |
| 2009/0214025 A1* | 8/2009 | Golic | 380/28 |
| 2010/0166174 A1* | 7/2010 | Ghouti et al. | 380/28 |
| 2010/0169644 A1* | 7/2010 | Ghouti et al. | 713/169 |
| 2010/0169658 A1* | 7/2010 | Ghouti et al. | 713/181 |

FOREIGN PATENT DOCUMENTS

| | | |
|---|---|---|
| EP | 0892520 | 1/1999 |
| EP | 1215642 | 6/2002 |
| WO | WO9904332 | 1/1999 |

OTHER PUBLICATIONS

Johnson, Don and Alfred Menezes. "The Elliptic Curve Digital Signature Algorithm (ECDSA)", Feb. 2000.*

* cited by examiner

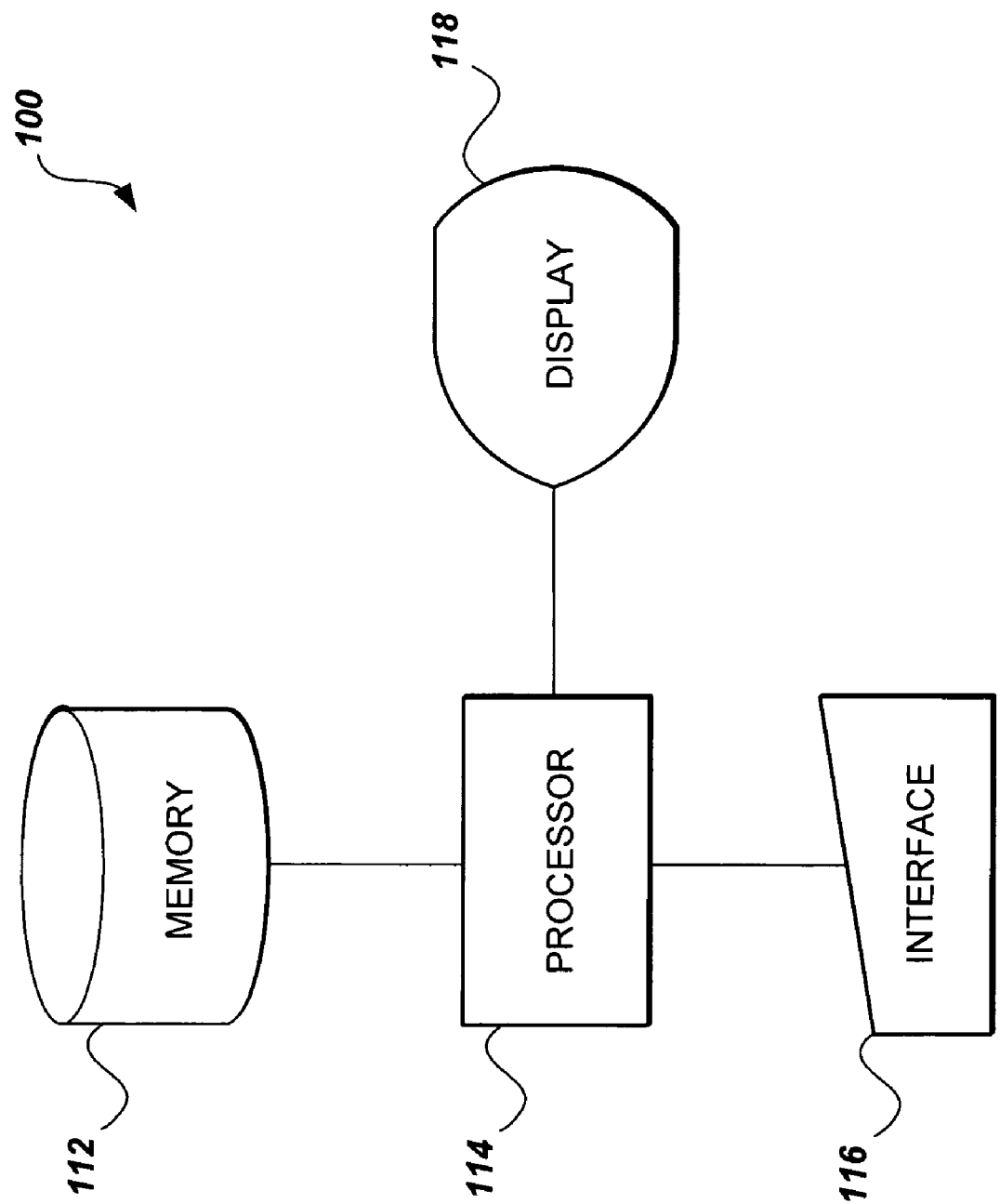

METHOD OF CIPHER BLOCK CHAINING USING ELLIPTIC CURVE CRYPTOGRAPHY

BACKGROUND OF THE INVENTION

1. Field of the Invention

The present invention relates to computerized cryptographic methods for communications in a computer network or electronic communications system, and particularly to a method of cipher block chaining using elliptic curve cryptography based upon the elliptic curve discrete logarithm problem.

2. Description of the Related Art

In recent years, the Internet community has experienced explosive and exponential growth. Given the vast and increasing magnitude of this community, both in terms of the number of individual users and web sites, and the sharply reduced costs associated with electronically communicating information, such as e-mail messages and electronic files, between one user and another, as well as between any individual client computer and a web server, electronic communication, rather than more traditional postal mail, is rapidly becoming a medium of choice for communicating information. The Internet, however, is a publicly accessible network, and is thus not secure. The Internet has been, and increasingly continues to be, a target of a wide variety of attacks from various individuals and organizations intent on eavesdropping, intercepting and/or otherwise compromising or even corrupting message traffic flowing on the Internet, or further illicitly penetrating sites connected to the Internet.

Encryption by itself provides no guarantee that an enciphered message cannot or has not been compromised during transmission or storage by a third party. Encryption does not assure integrity due to the fact that an encrypted message could be intercepted and changed, even though it may be, in any instance, practically impossible, to cryptanalyze. In this regard, the third party could intercept, or otherwise improperly access, a ciphertext message, then substitute a predefined illicit ciphertext block(s), which that party, or someone else acting in concert with that party, has specifically devised for a corresponding block(s) in the message. The intruding party could thereafter transmit the resulting message with the substituted ciphertext block(s) to the destination, all without the knowledge of the eventual recipient of the message.

The field of detecting altered communication is not confined to Internet messages. With the burgeoning use of stand-alone personal computers, individuals or businesses often store confidential information within the computer, with a desire to safeguard that information from illicit access and alteration by third parties. Password controlled access, which is commonly used to restrict access to a given computer and/or a specific file stored thereon, provides a certain, but rather rudimentary, form of file protection. Once password protection is circumvented, a third party can access a stored file and then change it, with the owner of the file then being completely oblivious to any such change.

Methods of adapting discrete-logarithm based algorithms to the setting of elliptic curves are known. However, finding discrete logarithms in this kind of group is particularly difficult. Thus, elliptic curve-based crypto algorithms can be implemented using much smaller numbers than in a finite-field setting of comparable cryptographic strength. Therefore, the use of elliptic curve cryptography is an improvement over finite-field based public-key cryptography.

Block ciphers are presently the most popular algorithms in use for providing data privacy. Block ciphers with a block size n and a key size k can be viewed as a family of permutations on the set of all n-bit strings, indexed by k-bit long encryption keys and possessing certain properties.

Some of the properties that are typically required of block ciphers are simplicity of construction and security. With regard to security, it is usually assumed that the underlying block cipher is secure and that the key size k is chosen so that an exhaustive key search is computationally infeasible. In practice, there are two issues to be considered with respect to security: (i) for a randomly chosen key k, it appears as a random permutation on the set of n-bit strings to any computationally bounded observer (i.e., one who does not have an unlimited amount of processing power available) who does not know k and who can only see encryption of a certain number of plaintexts x of their choice; and (ii) to achieve a so-called semantic security which is resistant to collision attacks such as birthday and meet-in-the-middle attacks. Such attacks have been proven to reduce an exhaustive key search significantly against block ciphers. In practice, most data units (including any typical file, database record, IP packet, or email message) which require encryption are greater in length than the block size of the chosen cipher. This will require the application of the block cipher function multiple times. The encryption of many plaintext blocks under the same key, or the encryption of plaintexts having identical parts under the same key may leak information about the corresponding plaintext. In certain situations, it is impossible to achieve semantic security. The goal then is to leak the minimum possible amount of information.

A further property is scalability. Obviously, no block cipher can be secure against a computationally unbounded attacker capable of running an exhaustive search for the unknown value of k. Furthermore, the development of faster machines will reduce the time it takes to perform an exhaustive key search. There is always a demand for more secure ciphers. It will be advantageous to develop a block cipher which is scalable so that an increase in security can be achieved by simply changing the length of the key rather than changing the block cipher algorithm itself.

Another property is efficiency. It is obvious that block ciphers are made computationally efficient to encrypt and decrypt to meet the high data rates demands of current applications such as in multimedia. Furthermore, since speed of execution is also important, it is advantageous to have block cipher that can be implemented in parallel. Of further interest is random access. Some modes allow encrypting and decrypting of any given block of the data in an arbitrary message without processing any other portions of the message.

Keying material is also an important factor in block ciphers. Some modes require two independent block cipher keys, which leads to additional key generation operations, a need for extra storage space or extra bits in communication. Additionally, of interest, are counter/IV/nonce requirements. Almost all modes make use of certain additional values together with block cipher key(s). In certain cases, such values must be generated at random or may not be reused with the same block cipher key to achieve the required security goals. Further, pre-processing capability is another important factor in block ciphers The Data Encryption Standard (DES) is a public standard and is presently the most popular and extensively used system of block encryption. DES was adopted as a federal government standard in the United States in 1977 for the encryption of unclassified information. The rapid developments in computing technology in recent years, in particular the ability to process vast amounts of data at high speed, meant that DES could not withstand the application of brute force in terms of computing power. In the late 1990's, specialized "DES cracker" machines were built that could recover a DES key after a few hours by trying possible key values. As a result, after 21 years of application, the use of DES was discontinued by the United States in 1998.

A new data encryption standard called Advanced Encryption Standard (AES) was launched in 2001 in the United States, and it was officially approved with effect from 26 May 2002. However, AES has no theoretical or technical innovation over its predecessor, DES. The basic concept remains the same and, essentially, all that has changed is that the block size n has been doubled. The AES standard specifies a block size of 128 bits and key sizes of 128, 192 or 256 bits. Although the number of 128-bit key values under AES is about $10^{21}$ times greater than the number of 56-bit DES keys, future advances in computer technology may be expected to compromise the new standard in due course. Moreover, the increase in block size may be inconvenient to implement.

Furthermore, AES is not based on known computationally hard problems, such as performing factorization or solving a discrete logarithm problem. It is known that encryption methods that are based on known cryptographic problems are usually stronger than those that are not based on such problems. Also, AES provides a limited degree of varying security, 128-bits, 192-bits and 256-bits; i.e., it not truly scalable. It should noted that to have a cipher with a higher degree of security, the cipher would probably need a completely new algorithm which will make the hardware for AES redundant. As a clear example, the hardware for DES cannot be used efficiently for AES. Also, the hardware of the 192-bits AES cipher is not completely compatible with the hardware of the other two ciphers 128-bits and 256-bits.

There are many ways of encrypting data stream that are longer than a block size, where each is referred to as a "mode of operation". Two of the standardized modes of operation employing DES are Electronic Code Book (ECB), and Cipher Block Chaining (CBC). It should be noted that the security of a particular mode should in principle be equivalent to the security of the underlying cipher. For this, we need to show that a successful attack on the mode of operation gives us almost an equally successful attack on the underlying cipher.

With regard to the ECB mode, in order to encrypt a message of arbitrary length, the message is split into consecutive n-bit blocks, and each block is encrypted separately. Encryption in ECB mode maps identical blocks in plaintext to identical blocks in ciphertext, which obviously leaks some information about plaintext. Even worse, if a message contains significant redundancy and is sufficiently long, the attacker may get a chance to run statistical analysis on the ciphertext and recover some portions of the plaintext. Thus, in some cases, security provided by ECB is unacceptably weak. ECB may be a good choice if all is need is protection of very short pieces of data or nearly random data. A typical use case for ECB is the protection of randomly generated keys and other security parameters.

With regard to CBC mode, in this mode the exclusive-or (XOR) operation is applied to each plaintext block and the previous ciphertext block, and the result is then encrypted. An n-bit initialization vector IV is used to encrypt the very first block. Unlike ECB, CBC hides patterns in plaintext. In fact, it can be proved that there is a reduction of security of CBC mode to security of the underlying cipher provided that IV is chosen at random. The computational overhead of CBC is just a single XOR operation per block encryption/decryption, so its efficiency is relatively good. Further, CBC provides random read access to encrypted data; i.e., to decrypt the i-th block, we do not need to process any other blocks. However, any change to the i-th message block would require re-encryption of all blocks with indexes greater than i. Thus, CBC does not support random write access to encrypted data.

The most serious drawback of CBC is that it has some inherent theoretical problems. For example, if $M_i$ denotes the i-th plaintext block and $C_i$ denotes the i-th ciphertext block, if one observes in a ciphertext that $C_i = C_j$, it immediately follows that $M_i$ XOR $M_j = C_{i-1}$ XOR $C_{j-1}$, where the right-hand side of the equation is known. This is called the "birthday" or matching ciphertext attack. Of course, if the underlying cipher is good in the sense of pseudorandom permutation, and its block size is sufficiently large, the probability of encountering two identical blocks in ciphertext is very low.

Another example of its security weakness is its use of XOR-based encryption. A further drawback of CBC is that its randomization must be synchronized between the sending and the receiving correspondent. CBC uses an initialization vector that must be generated at random. This initialization vector must be synchronized between the sending and receiving correspondent for correct decryption.

From the above, it is clear that the security of encrypting a sequence of message blocks using a block cipher depends on two aspects: the security of the underlying block cipher; and the effectiveness of the randomization used in reducing collision attacks when encrypting a sequence of blocks.

With regard to the security of the underlying block cipher, it is known that encryption methods that are based on computationally hard problems, such as performing factorization or solving a discrete logarithm problem, are usually stronger than those that are not based on such problems. Integer factorization can be formulated as follows: For an integer n that is the product of two primes p and q, the problem is to find the values of p and q given n only. The problem becomes harder for larger primes. The discrete logarithm problem can be formulated as follows: Given a value g and a value y whose value is equal to $g^k$ defined over a group, find the value of k. The problem becomes harder for larger groups. Although the applications of integer factorization and discrete logarithm problems in designing block ciphers is known, the resulting ciphers are computationally more demanding than those currently used, such as AES.

With regard to the effectiveness of randomization and semantic security, the one time pad is the only unconditionally semantically secure cipher presently in use. With the one time pad, the sequence of keys does not repeat itself. In other words, it is said to have an infinite cycle. However, since the sending and the receiving correspondents have to generate the same random sequence, the one time pad is impractical because of the long sequence of the non-repeating key. As a consequence, the keys to encrypt and decrypt in all private-key systems, including block ciphers, remain unchanged for every message block, or they are easily derived from each other by inference using identical random number generators at the sending and receiving correspondent. Furthermore, these generators must be initialized to the same starting point at both correspondents to ensure correct encryption and decryption. This is true of all the existing block ciphers, including the RNS encryption and decryption method discussed above.

Many methods have been proposed to construct a pseudo-random number generator or adaptive mechanisms for pseudo-random generation of permutations. Such methods include those based on tables that are used to increase randomization. However, no matter how good the randomization property of the underlying generator, it always has a finite number of states and, hence, the numbers generated by existing generators have a finite cycle where a particular sequence is repeated one cycle after other. Therefore, such block ciphers are vulnerable to collision attacks. Thus, the security of such block ciphers is very much dependant on the randomness of the random number generator. The RNS encryption and decryption method described above is not an exception. As a consequence, one can conclude that semantic insecurity is inherent in all existing block ciphers, but with varying degrees.

In the following, existing ciphers where both the sending and the receiving correspondents have to generate the same random sequence will be referred to as synchronized-randomization ciphers. Synchronized-randomization is achieved under the control of a key or some form of an initialization mechanism. Starting from this initial value, the subsequent keys are easily obtained by some form of a random number generator. Therefore, synchronized-randomization between encryption and decryption is guaranteed as long as identical random number generators are used by both correspondents and as long as the generators at both correspondents are synchronized to start from the same initial state. Thus, no unilateral change in the randomization method is allowed in synchronized-randomization.

In practice, an elliptic curve group over a finite field F is formed by choosing a pair of a and b coefficients, which are elements within F. The group consists of a finite set of points $P(x,y)$ which satisfy the elliptic curve equation $F(x,y)=y^2-x^3-ax-b=0$, together with a point at infinity, O. The coordinates of the point, x and y, are elements of F represented in N-bit strings. In the following, a point is either written as a capital letter (e.g., point P) or as a pair in terms of the affine coordinates; i.e. (x,y).

The elliptic curve cryptosystem relies upon the difficulty of the elliptic curve discrete logarithm problem (ECDLP) to provide its effectiveness as a cryptosystem. Using multiplicative notation, the problem can be described as: given points B and Q in the group, find a number k such that $B^k=Q$; where k is the discrete logarithm of Q to the base B. Using additive notation, the problem becomes: given two points B and Q in the group, find a number k such that $kB=Q$.

In an elliptic curve cryptosystem, the large integer k is kept private and is often referred to as the secret key. The point Q together with the base point B are made public and are referred to as the public key. The security of the system, thus, relies upon the difficulty of deriving the secret k, knowing the public points B and Q. The main factor which determines the security strength of such a system is the size of its underlying finite field. In a real cryptographic application, the underlying field is made so large that it is computationally infeasible to determine k in a straightforward way by computing all the multiples of B until Q is found.

At the heart of elliptic curve geometric arithmetic is scalar multiplication, which computes kB by adding together k copies of the point B. Scalar multiplication is performed through a combination of point-doubling and point-addition operations. The point-addition operations add two distinct points together and the point-doubling operations add two copies of a point together. To compute, for example, $B=(2*(2*(2B)))+2B=Q$, it would take three point-doublings and two point-additions.

Addition of two points on an elliptic curve is calculated as follows: when a straight line is drawn through the two points, the straight line intersects the elliptic curve at a third point. The point symmetric to this third intersecting point with respect to the x-axis is defined as a point resulting from the addition. Doubling a point on an elliptic curve is calculated as follows: when a tangent line is drawn at a point on an elliptic curve, the tangent line intersects the elliptic curve at another point. The point symmetric to this intersecting point with respect to the x-axis is defined as a point resulting from the doubling. Table 1 illustrates the addition rules for adding two points $(x_1,y_1)$ and $(x_2,y_2)$; i.e., $(x_3,y_3)=(x_1,y_1)+(x_2,y_2)$:

TABLE 1

| Summary of Addition Rules: $(x_3, y_3) = (x_1, y_1) + (x_2, y_2)$ | |
|---|---|
| General Equations | $x_3 = m^2 - x_2 - x_1$ <br> $y_3 = m(x_3 - x_1) + y_1$ |
| Point Addition | $m = \dfrac{y_2 - y_1}{x_2 - x_1}$ |
| Point Doubling $(x_3, y_3) = 2(x_1, y_1)$ | $m = \dfrac{3x_1^2 - a}{2y_1}$ |
| $(x_2, y_2) = -(x_1, y_1)$ | $(x_3, y_3) = (x_1, y_1) + (-(x_2, y_2)) = O$ |
| $(x_2, y_2) = O - (x_1, y_1)$ | $(x_3, y_3) = (x_1, y_1) + O = (x_1, y_1) = (x_1, -y_1)$ |

For elliptic curve encryption and decryption, given a message point $(x_m,y_m)$, a base point $(x_B,y_B)$, and a given key, k, the cipher point $(x_C,y_C)$ is obtained using the equation $(x_C,y_C)=(x_m,y_m)+k(x_B,y_B)$.

There are two basics steps in the computation of the above equations. The first step is to find the scalar multiplication of the base point with the key, $k(x_B,y_B)$. The resulting point is then added to the message point, $(x_m,y_m)$ to obtain the cipher point. At the receiver, the message point is recovered from the cipher point, which is usually transmitted, along with the shared key and the base point $(x_m,y_m)=(x_C,y_C)-k(x_B,y_B)$.

As noted above, the x-coordinate, $x_m$, is represented as an N-bit string. However, not all of the N-bits are used to carry information about the data of the secret message. Assuming that the number of bits of the x-coordinate, $x_m$ that do not carry data is L, then the extra bits L are used to ensure that message data, when embedded into the x-coordinate, will lead to an $x_m$ value which satisfies the elliptic curve equation (1). Typically, if the first guess of $x_m$ is not on a curve, then the second or third try will be.

Thus, the number of bits used to carry the bits of the message data is (N−L). If the secret data is a K-bit string, then the number of elliptic curve points needed to encrypt the K-bit data is $$\left\lceil \frac{K}{N-L} \right\rceil.$$

It is important to note that the y-coordinate, $y_m$, of the message point carries no data bits.

Given a cubic equation in x defined over a finite field, F(p), of the form, $t=x^3+ax+b$, where $x \in F(p)$ $t \in F(p)$ $a \in F(p)$ and $b \in F(p)$, then any value of x will lead to a value of $t \in F(p)$. It should be noted that t could be either quadratic residue or non-quadratic residue. If t is quadratic residue, it can be written as $t=y^2$, and if t is non-quadratic residue, it can be written as $t=\overline{\alpha} y^2$ where $\overline{\alpha}$ is a non quadratic element of F(p); i.e., $\sqrt{\overline{\alpha}} \notin F(p)$. Thus, equation (5), can be written as $\alpha y^2 = x^3 + ax + b$, where $\alpha=1$ if t is quadratic residue, and $\alpha=\overline{\alpha}$ if t is non-quadratic residue.

It should be noted that for a specific coefficient $a, b \in F(p)$ that when $\alpha=1$, the resulting curve is an elliptic curve. However, if $\alpha=\overline{\alpha}$, this leads to a twist of the elliptic curve obtained with $\alpha=1$. Thus, any value of $x \in F(p)$ will lead to a point (x, $\sqrt{\alpha} y$) which is either on an elliptic curve or its twist. If $\alpha=1$, the point $(x, \sqrt{\alpha} y)$ is on the elliptic curve. If $\alpha=\overline{\alpha}$, the point $(x, \sqrt{\alpha} y)$ is on its twist.

Elliptic points can be formulated on a twist of an elliptic curve in the same fashion as they are formulated for elliptic curves. As result, elliptic curve cryptography can also be defined on twists of elliptic curves in the same manner as that described above. Equations for point addition on an elliptic curve or its twist are given in Table 2 below. If $\alpha=1$, the equations are for point addition on an elliptic curve, and when $\alpha=\bar{\alpha}$, the equations are for point addition on its twist.

TABLE 2

Summary of Addition Rules for elliptic curves or their twists:
$(x_3, \sqrt{\alpha}y_3) = (x_1, \sqrt{\alpha}y_1) + (x_2, \sqrt{\alpha}y_2)$

| | |
|---|---|
| General Equations | $x_3 = m^2 - x_2 - x_1$ <br> $\sqrt{\alpha}y_3 = m(x_3 - x_1) + \sqrt{\alpha}y_1$ |
| Point Addition | $m = \sqrt{\alpha}\, \dfrac{y_2 - y_1}{x_2 - x_1}$ |
| Point Doubling $(x_3, y_3) = 2(x_1, y_1)$ | $m = \dfrac{3x_1^2 - a}{2\sqrt{\alpha}\, y_1}$ |
| $(x_2, \sqrt{\alpha}y_2) = -(x_1, \sqrt{\alpha}y_1)$ <br> $(x_2, \sqrt{\alpha}y_2) = O -$ <br> $(x_1, \sqrt{\alpha}y_1)$ | $(x_3, \sqrt{\alpha}y_3) = (x_1, \sqrt{\alpha}y_1) + (-(x_2, \sqrt{\alpha}y_2)) = O$ <br> $(x_3, \sqrt{\alpha}y_3) = (x_1, \sqrt{\alpha}y_1) + O =$ <br> $(x_1, \sqrt{\alpha}y_1) = (x_1, -\sqrt{\alpha}y_1)$ |

Encryption and decryption equations are modified accordingly: $(x_c, \sqrt{\alpha}y_C) = (x_m, \sqrt{\alpha}y_m) + k(x_B, \sqrt{\alpha}y_B)$; and $(x_m, \sqrt{\alpha}y_m) = (x_C, \sqrt{\alpha}y_C) - k(x_B, \sqrt{\alpha}y_B)$.

When $\alpha=1$, the equations are the cryptography equations over an elliptic curve, and when $\alpha=\bar{\alpha}$, they define the cryptography equations over its twist. An attack method referred to as power analysis exists, in which the secret information is decrypted on the basis of leaked information. An attack method in which change in voltage is measured in cryptographic processing using secret information, such as DES (Data Encryption Standard) or the like, such that the process of the cryptographic processing is obtained, and the secret information is inferred on the basis of the obtained process is known.

An attack method, referred to as power analysis exists, in which the secret information is decrypted on the basis of leaked information. An attack method in which change in voltage is measured in cryptographic processing using secret information, such as DES (Data Encryption Standard) or the like, such that the process of the cryptographic processing is obtained, and the secret information is inferred on the basis of the obtained process is known.

As one of the measures against power analysis attack on elliptic curve cryptosystems, a method using randomized projective coordinates is known. This is a measure against an attack method of observing whether a specific value appears or not in scalar multiplication calculations, and inferring a scalar value from the observed result. By multiplication with a random value, the appearance of such a specific value is prevented from being inferred.

In the above-described elliptic curve cryptosystem, attack by power analysis, such as DPA or the like, was not taken into consideration. Therefore, in order to relieve an attack by power analysis, extra calculation has to be carried out using secret information in order to weaken the dependence of the process of the cryptographic processing and the secret information on each other. Thus, time required for the cryptographic processing increases so that cryptographic processing efficiency is lowered.

With the development of information communication networks, cryptographic techniques have been indispensable elements for the concealment or authentication of electronic information. Efficiency in terms of computation time is a necessary consideration, along with the security of the cryptographic techniques. The elliptic curve discrete logarithm problem is so difficult that elliptic curve cryptosystems can make key lengths shorter than that in Rivest-Shamir-Adleman (RSA) cryptosystems, basing their security on the difficulty of factorization into prime factors. Thus, the elliptic curve cryptosystems offer comparatively high-speed cryptographic processing with optimal security. However, the processing speed is not always high enough to satisfy smart cards, for example, which have restricted throughput or servers which have to carry out large volumes of cryptographic processing.

The pair of equations for m in Table 1 are referred to as "slope equations". Computation of a slope equation in finite fields requires one finite field division. Alternatively, the slope computation can be computed using one finite field inversion and one finite field multiplication. Finite field division and finite field inversion are costly in terms of computational time because they require extensive CPU cycles for the manipulation of two elements of a finite field with a large order. Presently, it is commonly accepted that a point-doubling and a point-addition operation each require one inversion, two multiplications, a square, and several additions. At present, there are techniques to compute finite field division and finite field inversion, and techniques to trade time-intensive inversions for multiplications through performance of the operations in projective coordinates.

In cases where field inversions are significantly more time intensive than multiplication, it is efficient to utilize projective coordinates. An elliptic curve projective point $(X,Y,Z)$ in conventional projective (or homogeneous) coordinates satisfies the homogeneous Weierstrass equation: $\tilde{F}(X,Y,Z)=Y^2Z-X^3-aXZ^2-bZ^3=0$, and, when $z \neq 0$, it corresponds to the affine point $$(x, y) = \left(\frac{X}{Z}, \frac{Y}{Z}\right).$$

other projective representations lead to more efficient implementations of the group operation, such as, for example, the Jacobian representations, where the triplets $(X,Y,Z)$ correspond to the affine coordinates $$(x, y) = \left(\frac{X}{Z^2}, \frac{Y}{Z^3}\right)$$

whenever $Z \neq 0$. This is equivalent to using a Jacobian elliptic curve equation that is of the form $\tilde{F}_J(X,Y,Z)=Y^2-X^3-aXZ^4-bZ^6=0$.

Another commonly used projection is the Chudnovsky-Jacobian coordinate projection. In general terms, the relationship between the affine coordinates and the projection coordinates can be written as $$(x, y) = \left(\frac{X}{Z^i}, \frac{Y}{Z^j}\right)$$

where the values of i and j depend on the choice of the projective coordinates. For example, for homogeneous coordinates, i=1 and j=1.

The use of projective coordinates circumvents the need for division in the computation of each point addition and point doubling during the calculation of scalar multiplication. Thus, finite field division can be avoided in the calculation of scalar multiplication, $$k\left(\frac{X_B}{Z_B^i}, \frac{Y_B}{Z_B^j}\right),$$

when using projective coordinates.

The last addition for the computation of the cipher point, $$\left(\frac{X_m}{Z_m^i}, \frac{Y_m}{Z_m^j}\right) \text{ and } k\left(\frac{X_B}{Z_B^i}, \frac{Y_B}{Z_B^j}\right),$$

i.e., the addition of the two points $$\left(\frac{X_C}{Z_C^i}, \frac{Y_C}{Z_C^j}\right);$$

can also be carried out in the chosen projection coordinate:

$$\left(\frac{X_C}{Z_C^i}, \frac{Y_C}{Z_C^j}\right) = \left(\frac{X_m}{Z_m^i}, \frac{Y_{m1}}{Z_m^j}\right) + \left(\frac{X_B}{Z_B^i}, \frac{Y_B}{Z_B^j}\right).$$

It should be noted that $Z_m=1$.

However, one division (or one inversion and one multiplication) must still be carried out in order to calculate $$x_C = \frac{X_C}{Z_C^i},$$

since only the affine x-coordinate of the cipher point, $x_c$, is sent by the sender.

Thus, the encryption of (N−L) bits of the secret message using elliptic curve encryption requires at least one division when using projective coordinates. Similarly, the decryption of a single message encrypted using elliptic curve cryptography also requires at least one division when using projective coordinates.

Thus, a method of cipher block chaining using elliptic curve cryptography solving the aforementioned problems is desired.

SUMMARY OF THE INVENTION

The method of cipher block chaining using elliptic curve cryptography allows for the encryption of messages through elliptic curve cryptography and, particularly, with the performance of cipher block chaining utilizing both the elliptic curve and its twist, regardless of whether the elliptic curve and its twist are isomorphic with respect to one another. The method of performing elliptic curve cryptography is based on the elliptic curve discrete logarithm problem. It is well known that an elliptic curve discrete logarithm problem is a computationally "difficult" or "hard" problem.

The method includes the following steps: (a) defining a maximum block size that can be embedded into (nx+1) x-coordinates and ny y-coordinates, wherein n is an integer, and setting the maximum block size to be (nx+ny+1)N bits, wherein N is an integer; (b) a sending correspondent and a receiving correspondent agree upon the values of nx and ny, and further agree on a set of coefficients a,b∈F, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic curve $(x_B, y_B) \in EC$ and a base point on the twist of the elliptic curve $(x_{TB}, \sqrt{\alpha} y_{TB}) \in TEC$.

The sending correspondent then performs the following steps: (c) embedding a bit string of the secret key into the x-coordinate of a key elliptic point $(x_k, \sqrt{\alpha_k} y_k)$; (d) computing a scalar multiplication $(x_{TS_0}, \sqrt{\alpha} y_{TS_0}) = k(x_{TB}, \sqrt{\alpha} y_{TB})$ if $(x_k, \sqrt{\alpha_k} y_k)$ is on the elliptic curve, wherein $\alpha_k=1$, and setting $(x_{S_0}, y_{S_0}) = (x_k, y_k)$, wherein if $\alpha_k=\alpha_o$, then computing a scalar multiplication $(x_{S_0}, y_{S_0}) = k(x_B, y_B)$ and setting $(x_{TS_0}, \sqrt{\alpha} y_{TS_0}) = (x_k, \sqrt{\alpha} y_k)$; (e) embedding the message N-bit string of an initial block, which is referred to as the 0-th block, into the x-coordinate of an elliptic message point $(x_{m_0}, \sqrt{\alpha_{m_0}} y_{m_0})$; (f) computing a set of cipher points as $(x_{c_0}, y_{c_0}) = (x_{m_0}, y_{m_0}) + (x_{S_0}, y_{S_0})$ and $(x_{Tc_0}, \sqrt{\alpha} y_{Tc_0}) = (x_{TS_0}, \sqrt{\alpha} y_{TS_0})$ if the message point of the 0-th block is on the elliptic curve, where $\alpha_{m_0}=1$, wherein if otherwise, the set of cipher points are computed as $(x_{Tc_0}, \sqrt{\alpha} y_{Tc_0}) = (x_{m_0}, \sqrt{\alpha} y_{m_0}) + (x_{TS_0}, \sqrt{\alpha} y_{TS_0})$ and $(x_{c_0}, y_{c_0}) = (x_{S_0}, y_{S_0})$; (g) sending appropriate bits of the x-coordinate of the cipher point $(x_{c_0}, y_{c_0})$ to the receiving correspondent, together with any other information needed to recover the message point without sacrificing security if the message point of the 0-th block is on the elliptic curve, wherein if the message point of the 0-th block is on the twist of the elliptic curve, the appropriate bits of the x-coordinate of the cipher point $(x_{Tc_0}, \sqrt{\alpha} y_{Tc_0})$ are sent to the receiving correspondent, together with any other information needed to recover the message point without sacrificing security; (h) establishing integers i and u and iteratively repeating the following steps i) through k) until i>u: (i) embedding the message N-bit string of an i-th block into the x-coordinate of the elliptic message point $(x_{m_i}, \sqrt{\alpha_{m_i}} y_{m_i})$; (j) computing the set of cipher points as $(x_{c_i}, y_{c_i}) = (x_{m_i}, y_{m_i}) + (x_{S_i}, y_{S_i})$ and $(x_{Tc_i}, \sqrt{\alpha} y_{Tc_i}) = (x_{Tc_{i-1}}, \sqrt{\alpha} y_{Tc_{i-1}})$ if the message point of the i-th block is on the elliptic curve, where $\alpha_{m_i}=1$, wherein if otherwise, the set of cipher points are computed as $(x_{Tc_i}, \sqrt{\alpha} y_{Tc_i}) = (x_{m_i}, \sqrt{\alpha} y_{m_i}) + (x_{Tc_{i-1}}, \sqrt{\alpha} y_{Tc_{i-1}})$ and $(x_{c_i}, y_{c_i}) = (x_{c_i}, y_{c_i})$; (k) sending appropriate bits of the x-coordinate of the cipher point $(x_{c_i}, y_{c_i})$ to the receiving correspondent, together with any other information needed to recover the message point without sacrificing security if the message point of the i-th block is on the elliptic curve, wherein if the message point of the i-th block is on the twist of the elliptic curve, the appropriate bits of the x-coordinate of the cipher point $(x_{Tc_i}, \sqrt{\alpha} y_{Tc_i})$ are sent to the receiving correspondent, together with any other information needed to recover the message point without sacrificing security.

The receiving correspondent then performs the following steps: (l) embedding the bit string of the secret key into the x-coordinate of the key elliptic point $(x_k, \sqrt{\alpha_k} y_k)$; (m) computing a scalar multiplication $(x_{TS_0}, \sqrt{\alpha} y_{TS_0}) = k(x_{TB}, \sqrt{\alpha} y_{TB})$ if $(x_k, \sqrt{\alpha_k} y_k)$ is on the elliptic curve, where $\alpha_k=1$, and setting $(x_{S_0}, y_{S_0}) = (x_k, y_k)$, wherein if $\alpha_k=\overline{\alpha}$, then computing a scalar multiplication $(x_{S_0}, y_{S_0}) = k(x_B, y_B)$ and setting $(x_{TS_0}, \sqrt{\alpha} y_{TS_0}) = (x_k, \sqrt{\alpha} y_k)$; (n) computing a message point as $(x_{m_0}, y_{m_0}) = (x_{c_0}, y_{c_0}) - (x_{S_0}, y_{S_0})$ and setting $(x_{Tc_0}, \sqrt{\alpha} y_{Tc_0}) = (x_{TS_0}, \sqrt{\alpha} y_{TS_0})$ if the received cipher point of the 0-th block $(x_{c_0}, y_{c_0})$ is on the elliptic curve, wherein if the received cipher point $(x_{Tc_0}, \sqrt{\alpha}y_{Tc_0})$ is on the twist of the elliptic curve, the message point $(x_{m_0}, \sqrt{\alpha}y_{m_0})$ is computed as $(x_{m_0}, \sqrt{\alpha}y_{m_0}) = (x_{Tc_0}, \sqrt{\alpha}y_{Tc_0}) - (x_{TS_0}, \sqrt{\alpha}y_{TS_0})$ and $(x_{c_0}, y_{c_0}) = (x_{S_0}, y_{S_0})$; (o) recovering the secret message bit string of 0-th block from the x-coordinate of the point $(x_{m_0}, y_{m_0})$ if the message point is on the elliptic curve, wherein the secret message bit string of the 0-th block is recovered from the x-coordinate of the point $(x_{m_0}, \sqrt{\alpha}y_{m_0})$ if the message point is on the twist of the elliptic curve, and using any additional information received from the sending correspondent; (p) setting i=0 and iteratively repeating the following steps q) through r) until i>u: (q) computing the message point as $(x_{m_i}, y_{m_i}) = (x_{c_i}, y_{c_i}) - (x_{c_{i-1}}, y_{c_{i-1}})$ and $(x_{Tc_i}, \sqrt{\alpha}y_{Tc_i}) = (x_{Tc_{i-1}}, \sqrt{\alpha}y_{Tc_{i-1}})$ if the received cipher point of the i-th block $(x_{c_i}, y_{c_i})$ is on the elliptic curve, wherein if the received cipher point $(x_{Tc_0}, \sqrt{\alpha}y_{Tc_0})$ is on the twist of the elliptic curve, the message point $(x_{m_i}, \sqrt{\alpha}y_{m_i})$ is computed as $(x_{m_i}, \sqrt{\alpha}y_{m_i}) = (x_{Tc_i}, \sqrt{\alpha}y_{Tc_i}) - (x_{Tc_{i-1}}, \sqrt{\alpha}y_{Tc_{i-1}})$ and $(x_{c_i}, y_{c_i}) = (x_{c_{i-1}}, y_{c_{i-1}})$; and (r) recovering the secret message bit string of i-th block from the x-coordinate of the point $(x_{m_i}, y_{m_i})$ if the message point is on the elliptic curve, wherein the secret message bit string of the i-th block is recovered from the x-coordinate of the point $(x_{m_i}, \sqrt{\alpha}y_{m_i})$ if the message point is on the twist of the elliptic curve, and using any additional information received from the sending correspondent.

These and other features of the present invention will become readily apparent upon further review of the following specification and drawings.

BRIEF DESCRIPTION OF THE DRAWINGS

The sole drawing FIGURE is a block diagram illustrating system components for implementing the method of cipher block chaining using elliptic curve cryptography according to the present invention.

DETAILED DESCRIPTION OF THE PREFERRED EMBODIMENTS

The method of cipher block chaining using elliptic curve cryptography provides elliptic curve cryptographic methods based on the elliptic curve discrete logarithm problem. It is well known that an elliptic curve discrete logarithm problem is a computationally "difficult" or "hard" problem.

The cipher block chaining methods to be described below use elliptic curves in their generation, where different elliptic curves are used for different blocks of the same plaintext. Particularly, the password protocols use an elliptic curve with more than one independent x-coordinate. More specifically, a set of elliptic curve points are used which satisfy an elliptic curve equation with more than one independent x-coordinate which is defined over a finite field F having the following properties: One of the variables (the y-coordinate) has a maximum degree of two, and appears on its own in only one of the monomials; the other variables (the x-coordinates) have a maximum degree of three, and each must appear in at least one of the monomials with a degree of three; and all monomials that contain x-coordinates must have a total degree of three.

The group of points of the elliptic curve with the above form is defined over additions in the extended dimensional space, and, as will be described in detail below, the method makes use of elliptic curves where different elliptic curves are used for different blocks of the same plaintext.

The particular advantage of using elliptic curve cryptography with more than one x-coordinate is that additional x-coordinates are used to embed extra message data bits in a single elliptic point that satisfies the elliptic curve equation. Given that nx additional x-coordinates are used, with nx being greater than or equal to one, a resulting elliptic point has (nx+1) x-coordinates, where all coordinates are elements of the finite field F. The number of points which satisfy an elliptic curve equation with nx additional x-coordinates defined over F and which can be used in the corresponding cryptosystem is increased by a factor of $(\#F)^{nx}$, where # denotes the size of a field.

Through the use of this particular method, security is increased through the usage of different elliptic curves for different message blocks during the cipher block chaining. Further, each elliptic curve used for each message block is selected at random, preferably using an initial value and a random number generator.

Given the form of the elliptic curve equation described above, the elliptic curve and its twist are isomorphic with respect to one another. The method uses an embedding technique, to be described in greater detail below, which allows the embedding of a bit string into the x-coordinates of an elliptic curve point in a deterministic and non-iterative manner when the elliptic curve has the above described form. This embedding method overcomes the disadvantage of the time overhead of the iterative embedding methods used in existing elliptic curve-based methods.

The difficulty of using conventional elliptic curve cryptography for cipher block chaining typically lies in the iterative and non-deterministic method needed to embed a bit string into an elliptic curve point, which has the drawback of the number of iterations needed being different for different bit strings which are being embedded. As a consequence, different calculation times are required for different blocks of bit strings. Such a data-dependant generation time is not suitable for cipher block chaining methods, which require data independent encryption time. Further, with regard to iterative and non-deterministic methods in conventional elliptic curve cryptography, given an elliptic curve defined over a finite field that needs N-bits for the representation of its elements, only $((nx+ny+1)N-L)$ bits of the message data bits can be embedded in any elliptic curve point.

The isomorphic relationship between an elliptic curve and its twist, which is obtained as a result of the given form of the elliptic curve equation, ensures that any bit string whose equivalent binary value is an element of the underlying finite field has a bijective relationship between the bit string and a point which is either on the elliptic curve or its twist. This bijective relationship allows for the development of the cipher block chaining to be described below.

In the conventional approach to elliptic curve cryptography, the security of the resulting cryptosystem relies on breaking the elliptic curve discrete logarithm problem, which can be summarized as: given the points $k(x_{0,B}, x_{1,B}, \ldots, x_{nx,B}, y_B)$ and $(x_{0,B}, x_{1,B}, \ldots, x_{nx,B}, y_B)$, find the scalar k.

Further, projective coordinates are used at the sending and receiving entities in order to eliminate inversion or division during each point addition and doubling operation of the scalar multiplication. It should be noted that all of present methods disclosed herein are scalable.

In the following, with regard to elliptic curves, the "degree" of a variable $u^i$ is simply the exponent i. A curve is defined as the sum of several terms, which are herein referred to as "monomials", and the total degree of a monomial $u^i v^j w^k$ is given by $(i+j+k)$. Further, in the following, the symbol $\epsilon$ denotes set membership.

One form of the subject elliptic curve equation with more than one x-coordinate and one or more y-coordinates is defined as follows: the elliptic curve is a curve with more than two independent variables such that the maximum total degree of any monomial in the curve is three; at least two or more of the variables, termed the x-coordinates, have a maximum degree of three, and each must appear in at least one of the monomials with a degree of three; and at least one or more variables, termed the y-coordinates, have a maximum degree of two, and each must appear in at least one of the monomials with a degree of two.

In a first embodiment, the cipher block chaining method utilizes a non-quadratic residue element of $F(p)$, $\overline{\alpha} \in F(p)$, where $\sqrt{\overline{\alpha}} \notin F(p)$. A point which may be located either on an elliptic curve $y^2=x^3+ax+b$ or its twist $\overline{\alpha}y^2=x^3+ax+b$ is represented as $(x, \sqrt{\alpha}y)$, where $\alpha$ is either equal to 1 or $\alpha_o$. If $\alpha=1$, the point $(x, \sqrt{\alpha}y)$ lies on an elliptic curve, while if $\alpha=\overline{\alpha}$, the point lies on its twist. EC represents the set of points that satisfy an elliptic curve equation, and TEC represents the set of points that satisfy its twist.

The first embodiment of the present method includes the following steps: (a) defining a maximum block size that can be embedded into (nx+1) x-coordinates and ny y-coordinates, wherein n is an integer, and setting the maximum block size to be (nx+ny+1)N bits, wherein N is an integer; (b) a sending correspondent and a receiving correspondent agree upon the values of nx and ny, and further agree on a set of coefficients a,b∈F, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic curve $(x_B, y_B) \in EC$ and a base point on the twist of the elliptic curve $(x_{TB}, \sqrt{\overline{\alpha}}y_{TB}) \in TEC$.

The sending correspondent then performs the following steps: (c) embedding a bit string of the secret key into the x-coordinate of a key elliptic point $(x_k, \sqrt{\alpha_k}y_k)$; d) computing a scalar multiplication $(x_{TS_0}, \sqrt{\overline{\alpha}}y_{TS_0})=k(x_{TB}, \sqrt{\overline{\alpha}}y_{TB})$ if $(x_k, \sqrt{\alpha_k}y_k)$ is on the elliptic curve, wherein $\alpha_k=1$, and setting $(x_{S_0}, y_{S_0})=(x_k, y_k)$ wherein if $\alpha_k=\overline{\alpha}$, then computing a scalar multiplication $(x_{S_0}, y_{S_0})=k(x_B, y_B)$ and setting $(x_{TS_0}, \sqrt{\overline{\alpha}}y_{TS_0})=(x_k, \sqrt{\overline{\alpha}}y_k)$; (e) embedding the message N-bit string of an initial block, which is referred to as the 0-th block, into the x-coordinate of an elliptic message point $(x_{m_0}, \sqrt{\alpha_{m_0}}y_{m_0})$; (f) computing a set of cipher points as $(x_{c_0}, y_{c_0})=(x_{m_0}, y_{m_0})+(x_{S_0}, y_{S_0})$ and $(x_{Tc_0}, \sqrt{\overline{\alpha}}y_{Tc_0})=(x_{TS_0}, \sqrt{\overline{\alpha}}y_{TS_0})$ if the message point of the 0-th block is on the elliptic curve, where $\alpha_{m_0}=1$, wherein if otherwise, the set of cipher points are computed as $(x_{Tc_0}, \sqrt{\overline{\alpha}}y_{Tc_0})=(x_{m_0}, \sqrt{\overline{\alpha}}y_{m_0})+(x_{TS_0}, \sqrt{\overline{\alpha}}y_{TS_0})$ and $(x_{c_0}, y_{c_0})=(x_{S_0}, y_{S_0})$; (g) sending appropriate bits of the x-coordinate of the cipher point $(x_{c_0}, y_{c_0})$ to the receiving correspondent, together with any other information needed to recover the message point without sacrificing security if the message point of the 0-th block is on the elliptic curve, wherein if the message point of the 0-th block is on the twist of the elliptic curve, the appropriate bits of the x-coordinate of the cipher point $(x_{Tc_0}, \sqrt{\overline{\alpha}}y_{Tc_0})$ are sent to the receiving correspondent, together with any other information needed to recover the message point without sacrificing security; (h) establishing integers i and u and iteratively repeating the following steps i) through k) until i>u: (i) embedding the message N-bit string of an i-th block into the x-coordinate of the elliptic message point $(x_{m_i}, \sqrt{\alpha_{m_i}}y_{m_i})$; (j) computing the set of cipher points as $(x_{c_i}, y_{c_i})=(x_{m_i}, y_{m_i})+(x_{S_i}, y_{S_i})$ and $(x_{Tc_i}, \sqrt{\overline{\alpha}}y_{Tc_i})=(x_{Tc_{i-1}}, \sqrt{\overline{\alpha}}y_{Tc_{i-1}})$ if the message point of the i-th block is on the elliptic curve, where $\alpha_{m_i}=1$, wherein if otherwise, the set of cipher points are computed as $(x_{Tc_i}, \sqrt{\overline{\alpha}}y_{Tc_i})=(x_{m_i}, \sqrt{\overline{\alpha}}y_{m_i})+(x_{Tc_{i-1}}, \sqrt{\overline{\alpha}}y_{Tc_{i-1}})$ and $(x_{c_i}, y_{c_i})=(x_{c_i}, y_{c_i})$ (k) sending appropriate bits of the x-coordinate of the cipher point $(x_{c_i}, y_{c_i})$ to the receiving correspondent, together with any other information needed to recover the message point without sacrificing security if the message point of the i-th block is on the elliptic curve, wherein if the message point of the i-th block is on the twist of the elliptic curve, the appropriate bits of the x-coordinate of the cipher point $(x_{Tc_i}, \sqrt{\overline{\alpha}}y_{Tc_i})$ are sent to the receiving correspondent, together with any other information needed to recover the message point without sacrificing security.

The receiving correspondent then performs the following steps: (l) embedding the bit string of the secret key into the x-coordinate of the key elliptic point $(x_k, \sqrt{\alpha_k}y_k)$; (m) computing a scalar multiplication $(x_{TS_0}, \sqrt{\overline{\alpha}}y_{TS_0})=k(x_{TB}, \sqrt{\overline{\alpha}}y_{TB})$ if $(x_k, \sqrt{\alpha_k}y_k)$ is on the elliptic curve, where $\alpha_k=1$, and setting $(x_{S_0}, y_{S_0})=(x_k, y_k)$, wherein if $\alpha_k=\overline{\alpha}$, then computing a scalar multiplication $(x_{S_0}, y_{S_0})=k(x_B, y_B)$ and setting $(x_{TS_0}, \sqrt{\overline{\alpha}}y_{TS_0})=(x_k, \sqrt{\overline{\alpha}}y_k)$; (n) computing a message point as $(x_{m_0}, y_{m_0})=(x_{c_0}, y_{c_0})-(x_{S_0}, y_{S_0})$ and setting $(x_{Tc_0}, \sqrt{\overline{\alpha}}y_{Tc_0})=(x_{TS_0}, \sqrt{\overline{\alpha}}y_{TS_0})$ if the received cipher point of the 0-th block $(x_{Tc_0}, y_{Tc_0})$ is on the elliptic curve, wherein if the received cipher point $(x_{Tc_0}, \sqrt{\overline{\alpha}}y_{Tc_0})$ is on the twist of the elliptic curve, the message point $(x_{m_0}, \sqrt{\overline{\alpha}}y_{m_0})$ is computed as $(x_{m_0}, \sqrt{\overline{\alpha}}y_{m_0})=(x_{Tc_0}, \sqrt{\overline{\alpha}}y_{Tc_0})-(x_{TS_0}, \sqrt{\overline{\alpha}}y_{TS_0})$ and $(x_{c_0}, y_{c_0})=(x_{S_0}, y_{S_0})$; (o) recovering the secret message bit string of 0-th block from the x-coordinate of the point $(x_{m_0}, y_{m_0})$ if the message point is on the elliptic curve, wherein the secret message bit string of the 0-th block is recovered from the x-coordinate of the point $(x_{m_0}, \sqrt{\overline{\alpha}}y_{m_0})$ if the message point is on the twist of the elliptic curve, and using any additional information received from the sending correspondent; (p) setting i=0 and iteratively repeating the following steps q) through r) until i>u: (q) computing the message point as $(x_{m_i}, y_{m_i})=(x_{c_i}, y_{c_i})-(x_{c_{i-1}}, y_{c_{i-1}})$ and $(x_{Tc_i}, \sqrt{\overline{\alpha}}y_{Tc_i})=(x_{Tc_{i-1}}, \sqrt{\overline{\alpha}}y_{Tc_{i-1}})$ if the received cipher point of the i-th block $(x_{c_i}, y_{c_i})$ is on the elliptic curve, wherein if the received cipher point $(x_{Tc_i}, \sqrt{\overline{\alpha}}y_{Tc_i})$ is on the twist of the elliptic curve, the message point $(x_{m_i}, \sqrt{\overline{\alpha}}y_{m_i})$ is computed as $(x_{m_i}, \sqrt{\overline{\alpha}}y_{m_i})=(x_{Tc_i}, \sqrt{\overline{\alpha}}y_{Tc_i})-(x_{Tc_{i-1}}, \sqrt{\overline{\alpha}}y_{Tc_{i-1}})$ and $(x_{c_i}, y_{c_i})=(x_{c_{i-1}}, y_{c_{i-1}})$; and (r) recovering the secret message bit string of i-th block from the x-coordinate of the point $(x_{m_i}, y_{m_i})$ if the message point is on the elliptic curve, wherein the secret message bit string of the i-th block is recovered from the x-coordinate of the point $(x_{m_i}, \sqrt{\overline{\alpha}}y_{m_i})$ if the message point is on the twist of the elliptic curve, and using any additional information received from the sending correspondent.

In an alternative embodiment, the cipher block chaining method includes the following steps: (a) defining a maximum block size that can be embedded into (nx+1) x-coordinates and ny y-coordinates, wherein n is an integer, and setting the maximum block size to be (nx+ny+1)N bits, wherein N is an integer; (b) a sending correspondent and a receiving correspondent agree upon the values of nx and ny, and further agree on a set of coefficients a,b∈F, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic curve $(x_B, y_B) \in EC$ and a base point on the twist of the elliptic curve $(x_{TB}, \sqrt{\overline{\alpha}}y_{TB}) \in TEC$.

The sending correspondent then performs the following steps: (c) embedding a bit string of the secret key into the x-coordinate of a key elliptic point $(x_k, \sqrt{\alpha_k}y_k)$; (d) computing a scalar multiplication $(x_{TS_0}, \sqrt{\overline{\alpha}}y_{TS_0})=k(x_{TB}, \sqrt{\overline{\alpha}}y_{TB})$ if $(x_k, \sqrt{\alpha_k}y_k)$ is on the elliptic curve, where $\alpha_k=1$, and setting $(x_{S_0}, y_{S_0})=(x_k, y_k)$, wherein if $\alpha_k=\overline{\alpha}$, then computing a scalar multiplication $(x_{S_0},y_{S_0})=k(x_B,y_B)$ and setting $(x_{TS_0},\sqrt{\alpha}y_{TS_0})=(x_k,\sqrt{\alpha}y_k)$; (e) embedding the message N-bit string of an initial block, which is referred to as the 0-th block, into the x-coordinate of an elliptic message point $(x_{m_0},\sqrt{\alpha_{m_0}}y_{m_0})$; (f) computing a set of cipher points as $(x_{c_0},y_{c_0})=(x_{m_0},y_{m_0})+(x_{S_0},y_{S_0})$ and $(x_{Tc_0},\sqrt{\alpha}y_{Tc_0})=(x_{TS_0},\sqrt{\alpha}y_{TS_0})$ if the message point of the 0-th block is on the elliptic curve, where $\alpha_{m_o}=1$, wherein if otherwise, the set of cipher points are computed as $(x_{Tc_0},\sqrt{\alpha}y_{Tc_0})=(x_{m_0},\sqrt{\alpha}y_{m_0})+(x_{TS_0},\sqrt{\alpha}y_{TS_0})$ and $(x_{c_0},y_{c_0})=(x_{S_0},y_{S_0})$; (g) sending appropriate bits of the x-coordinate of the cipher point $(x_{c_0},y_{c_0})$ to the receiving correspondent, together with any other information needed to recover the message point without sacrificing security if the message point of the 0-th block is on the elliptic curve, wherein if the message point of the 0-th block is on the twist of the elliptic curve, the appropriate bits of the x-coordinate of the cipher point $(x_{Tc_0},\sqrt{\alpha}y_{Tc_0})$ are sent to the receiving correspondent, together with any other information needed to recover the message point without sacrificing security; (h) establishing integers i and u and iteratively repeating the following steps i) through I) until i>u: (i) embedding the message N-bit string of an i-th block into the x-coordinate of the elliptic message point $(x_{m_i},\sqrt{\alpha_{m_i}}y_{m_i})$; (j) doubling the points $(x_{S_i},y_{S_i})$ and $(x_{TS_i},y_{TS_i})$ as $(x_{S_i},y_{S_i})=2(x_{S_{i-1}},y_{S_{i-1}})$ and $(x_{TS_i},y_{TS_i})=2(x_{TS_{i-1}},\sqrt{\alpha}y_{TS_{i-1}})$, respectively; (k) computing the set of cipher points as $(x_{c_i},y_{c_i})=(x_{m_i},y_{m_i})+(x_{m_{i-1}},y_{m_{i-1}})+(x_{S_i},y_{S_i})$ and $(x_{Tc_i},\sqrt{\alpha}y_{Tc_i})=(x_{TS_i},\sqrt{\alpha}y_{TS_i})$ if the message point of the i-th block is on the elliptic curve, where $\alpha_{m_i}=1$, wherein if otherwise, the set of cipher points are computed as $(x_{Tc_i},\sqrt{\alpha}y_{Tc_i})=(x_{m_i},\sqrt{\alpha}y_{m_i})+(x_{m_{i-1}},\sqrt{\alpha}y_{m_{i-1}})+(x_{TS_i},\sqrt{\alpha}y_{TS_i})$ and $(x_{c_i},y_{c_i})=(x_{S_0},y_{S_0})$(l) sending appropriate bits of the x-coordinate of the cipher point $(x_{c_i},y_{c_i})$to the receiving correspondent, together with any other information needed to recover the message point without sacrificing security if the message point of the i-th block is on the elliptic curve, wherein if the message point of the i-th block is on the twist of the elliptic curve, the appropriate bits of the x-coordinate of the cipher point $(x_{Tc_i},\sqrt{\alpha}y_{Tc_i})$ are sent to the receiving correspondent, together with any other information needed to recover the message point without sacrificing security.

The receiving correspondent then performs the following steps: (m) embedding the bit string of the secret key into the x-coordinate of the key elliptic point $(x_k,\sqrt{\alpha_k}y_k)$; (n) computing a scalar multiplication $(x_{TS_0},\sqrt{\alpha_o}y_{TS_0})=k(x_{TB},\sqrt{\alpha_o}y_{TB})$ if $(x_k,\sqrt{\alpha_k}y_k)$ is on the elliptic curve, where $\alpha_k=1$, and setting $(x_{S_0},y_{S_0})=(x_k,y_k)$ wherein if $\alpha_k=\alpha_o$, then computing a scalar multiplication $(x_{S_0},y_{S_0})=k(x_B,y_B)$ and setting $(x_{TS_0},\sqrt{\alpha}y_{TS_0})=(x_k,\sqrt{\alpha}y_k)$; (o) computing a message point as $(x_{m_0},y_{m_0})=(x_{c_0},y_{c_0})-(x_{S_0},y_{S_0})$ and setting $(x_{Tc_0},\sqrt{\alpha}y_{Tc_0})=(x_{TS_0},\sqrt{\alpha}y_{TS_0})$ if the received cipher point of the 0-th block $(x_{c_0},y_{c_0})$ is on the elliptic curve, wherein if the received cipher point $(x_{Tc_0},\sqrt{\alpha}y_{Tc_0})$is on the twist of the elliptic curve, the message point $(x_{m_0},\sqrt{\alpha}y_{m_0})$ is computed as $(x_{m_0},\sqrt{\alpha}y_{m_0})=(x_{Tc_0},\sqrt{\alpha}y_{Tc_0})-(x_{TS_0},\sqrt{\alpha}y_{TS_0})$ and $(x_{c_0},y_{c_0})=(x_{S_0},y_{S_0})$; (p) recovering the secret message bit string of 0-th block from the x-coordinate of the point $(x_{m_0},y_{m_0})$ if the message point is on the elliptic curve, wherein the secret message bit string of the 0-th block is recovered from the x-coordinate of the point $(x_{m_0},\sqrt{\alpha}y_{m_0})$ if the message point is on the twist of the elliptic curve, and using any additional information received from the sending correspondent; (q) setting i=0 and iteratively repeating the following steps r) through t) until i>u: (r) doubling the points $(x_{S_i},y_{S_i})$ and $(x_{TS_i},y_{TS_i})$ as $(x_{S_i},y_{S_i})=2(x_{S_{i-1}},y_{S_{i-1}})$ and $(x_{TS_i},y_{TS_i})=2(x_{TS_{i-1}},\sqrt{\alpha}y_{TS_{i-1}})$, respectively; (s) computing the message point as $(x_{m_i},y_{m_i})=(x_{c_i},y_{c_i})-(x_{m_{i-1}},y_{m_{i-1}})-(x_{S_i},y_{S_i})$ and $(x_{Tc_i},\sqrt{\alpha}y_{Tc_i})=(x_{TS_i},\sqrt{\alpha}y_{TS_i})$ if the received cipher point of the i-th block $(x_{c_i},y_{c_i})$ is on the elliptic curve, wherein if the received cipher point $(x_{Tc_i},\sqrt{\alpha}y_{Tc_i})$ is on the twist of the elliptic curve, the message point $(x_{m_i},\sqrt{\alpha}y_{m_i})$ is computed as $(x_{m_i},\sqrt{\alpha}y_{m_i})=(x_{Tc_i},\sqrt{\alpha}y_{Tc_i})-(x_{m_{i-1}},\sqrt{\alpha}y_{m_{i-1}})-(x_{TS_i},\sqrt{\alpha}y_{TS_i})$ and $(x_{c_i},y_{c_i})=(x_{S_i},y_{S_i})$; and (t) recovering the secret message bit string of i-th block from the x-coordinate of the point $(x_{m_i},y_{m_i})$if the message point is on the elliptic curve, wherein the secret message bit string of the i-th block is recovered from the x-coordinate of the point $(x_{m_i},\sqrt{\alpha}y_{m_i})$ if the message point is on the twist of the elliptic curve, and using any additional information received from the sending correspondent.

In a further alternative embodiment, $S_{m_i}$ represents the N-bit string of the i-th message block. The method includes the following steps: (a) defining a maximum block size that can be embedded into (nx+1) x-coordinates and ny y-coordinates, wherein n is an integer, and setting the maximum block size to be (nx+ny+1)N bits, wherein N is an integer; (b) a sending correspondent and a receiving correspondent agree upon the values of nx and ny, and further agree on a set of coefficients a,b∈F, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic curve $(x_B,y_B)\in C$ and a base point on the twist of the elliptic curve $(x_{TB},\sqrt{\alpha}y_{TB})\in TEC$, the sending correspondent and the receiving correspondent further agreeing upon an initial vector $S_{m_{-1}}$.

The sending correspondent then performs the following steps: (c) embedding a bit string of the secret key into the x-coordinate of a key elliptic point $(x_k,\sqrt{\alpha_k}y_k)$; (d) computing a scalar multiplication $(x_{TS_0},\sqrt{\alpha}y_{TS_0})=k(x_{TB},\sqrt{\alpha}y_{TB})$ if $(x_k,\sqrt{\alpha_k}y_k)$ is on the elliptic curve, where $\alpha_k=1$, and setting $(x_{S_0},y_{S_0})=(x_k,y_k)$ wherein if $\alpha_k=\overline{\alpha}$, then computing a scalar multiplication $(x_{S_0},y_{S_0})=k(x_B,y_B)$ and setting $(x_{TS_0},\sqrt{\alpha}y_{TS_0})=(x_k,\sqrt{\alpha}y_k)$ (e) computing a message N-bit string $S'_{m_0}$ as $S'_{m_0}=S_{m_0}\oplus S_{m_{-1}}$ (f) embedding the message N-bit string $S'_{m_0}$ an initial block, which is referred to as the 0-th block, into the x-coordinate of an elliptic message point $(x_{m_0},\sqrt{\alpha_{m_0}}y_{m_0})$; (g) computing a set of cipher points as $(x_{c_0},y_{c_0})=(x_{m_0},y_{m_0})+(x_{S_0},y_{S_0})$ and $(x_{Tc_0},\sqrt{\alpha}y_{Tc_0})=(x_{TS_0},\sqrt{\alpha}y_{TS_0})$ if the message point of the 0-th block is on the elliptic curve, where $\alpha_{m_0}=1$, wherein if otherwise, the set of cipher points are computed as $(x_{Tc_0},\sqrt{\alpha}y_{Tc_0})=(x_{m_0},\sqrt{\alpha}y_{m_0})+(x_{TS_0},\sqrt{\alpha}y_{TS_0})$ and $(x_{c_0},y_{c_0})=(x_{S_0},y_{S_0})$; (h) sending appropriate bits of the x-coordinate of the cipher point $(x_{c_0},y_{c_0})$ to the receiving correspondent, together with any other information needed to recover the message point without sacrificing security if the message point of the 0-th block is on the elliptic curve, wherein if the message point of the 0-th block is on the twist of the elliptic curve, the appropriate bits of the x-coordinate of the cipher point $(x_{Tc_0},\sqrt{\alpha}y_{Tc_0})$ are sent to the receiving correspondent, together with any other information needed to recover the message point without sacrificing security; (i) establishing integers i and u and iteratively repeating the following steps (j) through (n) until i>u (j) computing the N-bit string $S'_{m_i}$ as $S'_{m_i}=S_{m_i}\oplus S_{m_{i-1}}$; (k) embedding the message N-bit string of an i-th block into the x-coordinate of the elliptic message point $(x_{m_i},\sqrt{\alpha_{m_i}}y_{m_i})$; (l) doubling the points $(x_{S_i},y_{S_i})$ and $(x_{TS_i},y_{TS_i})$ as $(x_{S_i},y_{S_i})=2(x_{S_{i-1}},y_{S_{i-1}})$ and $(x_{TS_i},y_{TS_i})=2(x_{TS_{i-1}},\sqrt{\alpha}y_{TS_{i-1}})$ respectively; (m) computing the set of cipher points as $(x_{c_i},y_{c_i})=(x_{m_i},y_{m_i})+(x_{m_{i-1}},y_{m_{i-1}})+(x_{S_i},y_{S_i})$ and $(x_{Tc_i},\sqrt{\alpha}y_{Tc_i})=(x_{TS_i},\sqrt{\alpha}y_{TS_i})$ if the message point of the i-th block is on the elliptic curve, where $\alpha_{m_i}=1$, wherein if otherwise, the set of cipher points are computed as $(x_{Tc_i},\sqrt{\alpha}y_{Tc_i})=(x_{m_i},\sqrt{\alpha}y_{m_i})+(x_{m_{i-1}},\sqrt{\alpha}y_{m_{i-1}})+(x_{TS_i},\sqrt{\alpha}y_{TS_i})$ and $(x_{c_i},y_{c_i})=(x_{S_i},y_{S_i})$; (n) sending appropriate bits of the x-coordinate of the cipher point $(x_{c_i}, y_{c_i})$ to the receiving correspondent, together with any other information needed to recover the message point without sacrificing security if the message point of the i-th block is on the elliptic curve, wherein if the message point of the i-th block is on the twist of the elliptic curve, the appropriate bits of the x-coordinate of the cipher point $(x_{Tc_i}, \sqrt{\alpha}y_{Tc_i})$ are sent to the receiving correspondent, together with any other information needed to recover the message point without sacrificing security.

The receiving correspondent then performs the following steps: (o) embedding the bit string of the secret key into the x-coordinate of the key elliptic point $(x_k, \sqrt{\alpha_k}y_k)$; (p) computing a scalar multiplication $(x_{TS_0}, \sqrt{\alpha_o}y_{TS_0}) = k(x_{TB}, \sqrt{\alpha_o}y_{TB})$ if $(x_k, \sqrt{\alpha_k}y_k)$ is on the elliptic curve, where $\alpha_k = 1$, and setting $(x_{S_0}, y_{S_0}) = (x_k, y_k)$ wherein if $\alpha_k = \alpha_o$, then computing a scalar multiplication $(x_{S_0}, y_{S_0}) = k(x_B, y_B)$ and setting $(x_{TS_0}, \sqrt{\alpha}y_{TS_0}) = (x_k, \sqrt{\alpha}y_k)$; (q) computing a message point as $(x_{m_0}, y_{m_0}) = (x_{c_0}, y_{c_0}) - (x_{S_0}, y_{S_0})$ and setting $(x_{Tc_0}, \sqrt{\alpha}y_{Tc_0}) = (x_{TS_0}, \sqrt{\alpha}y_{TS_0})$ if the received cipher point of the 0-th block $(x_{c_0}, y_{c_0})$ is on the elliptic curve, wherein if the received cipher point $(x_{Tc_0}, \sqrt{\alpha}y_{Tc_0})$ is on the twist of the elliptic curve, the message point $(x_{m_0}, \sqrt{\alpha}y_{m_0})$ is computed as $(x_{m_0}, \sqrt{\alpha}y_{m_0}) = (x_{Tc_0}, \sqrt{\alpha}y_{Tc_0}) - (x_{TS_0}, \sqrt{\alpha}y_{TS_0})$ and $(x_{c_0}, y_{c_0}) = (x_{S_0}, y_{S_0})$; (r) recovering the secret message bit string $S'_{m_0}$ of 0-th block from the x-coordinate of the point $(x_{m_0}, y_{m_0})$ if the message point is on the elliptic curve, wherein the secret message bit string of the 0-th block is recovered from the x-coordinate of the point $(x_{m_0}, \sqrt{\alpha}y_{m_0})$ if the message point is on the twist of the elliptic curve, and using any additional information received from the sending correspondent, and computing the message bit string $S_{m_0}$ as $S_{m_0} = S'_{m_0} \oplus S_{m_{i-1}}$; (s) setting i=0 and iteratively repeating the following steps t) through v) until i>u: (t) doubling the points $(x_{S_i}, y_{S_i})$ and $(x_{TS_i}, y_{TS_i})$ as $(x_{S_i}, y_{S_i}) = 2(x_{S_{i-1}}, y_{S_{i-1}})$ and $(x_{TS_i}, y_{TS_i}) = 2(x_{TS_{i-1}}, \sqrt{\alpha}y_{TS_{i-1}})$, respectively; (u) computing the message point as $(x_{m_i}, y_{m_i}) = (x_{c_i}, y_{c_i}) - (x_{m_{i-1}}, y_{m_{i-1}}) - (x_{S_i}, y_{S_i})$ and $(x_{Tc_i}, \sqrt{\alpha}y_{Tc_i}) = (x_{TS_i}, \sqrt{\alpha}y_{TS_i})$ if the received cipher point of the i-th block $(x_{c_i}, y_{c_i})$ is on the elliptic curve, wherein if the received cipher point $(x_{Tc_i}, \sqrt{\alpha}y_{Tc_i})$ is on the twist of the elliptic curve, the message point $(x_{m_i}, \sqrt{\alpha}y_{m_i})$ is computed as $(x_{m_i}, \sqrt{\alpha}y_{m_i}) = (x_{Tc_i}, \sqrt{\alpha}y_{Tc_i}) - (x_{m_{i-1}}, \sqrt{\alpha}y_{m_{i-1}}) - (x_{TS_i}, \sqrt{\alpha}y_{TS_i})$ and $(x_{c_i}, y_{c_i}) = (x_{S_i}, y_{S_i})$; and (v) recovering the secret message bit string of i-th block from the x-coordinate of the point $(x_{m_i}, y_{m_i})$ if the message point is on the elliptic curve, wherein the secret message bit string of the i-th block is recovered from the x-coordinate of the point $(x_{m_i}, \sqrt{\alpha}y_{m_i})$ if the message point is on the twist of the elliptic curve, and using any additional information received from the sending correspondent, and computing the message bit string $S_{m_i}$ as $S_{m_i} = S'_{m_i} \oplus S'_{m_{i-1}}$.

In another alternative embodiment, the cipher block chaining method includes the following steps: (a) defining a maximum block size that can be embedded into (nx+1) x-coordinates and ny y-coordinates, wherein n is an integer, and setting the maximum block size to be (nx+ny+1)N bits, wherein N is an integer; (b) a sending correspondent and a receiving correspondent agree upon the values of nx and ny, and further agree on a set of coefficients a,b∈F, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic curve $(x_B, y_B) \in EC$ and a base point on the twist of the elliptic curve $(x_{TB}, \sqrt{\alpha}y_{TB}) \in TEC$.

The sending correspondent then performs the following steps: (c) embedding a bit string of the secret key into the x-coordinate of a key elliptic point $(x_k, \sqrt{\alpha_k}y_k)$; (d) computing a scalar multiplication $(x_{TS_0}, \sqrt{\alpha}y_{TS_0}) = k(x_{TB}, \sqrt{\alpha}y_{TB})$ if $(x_k, \sqrt{\alpha_k}y_k)$ is on the elliptic curve, where $\alpha_k = 1$, and setting $(x_{S_0}, y_{S_0}) = (x_k, y_k)$ wherein if $\alpha_k = \overline{\alpha}$, then computing a scalar multiplication $(x_{S_0}, y_{S_0}) = k(x_B, y_B)$ and setting $(x_{TS_0}, \sqrt{\alpha}y_{TS_0}) = (x_k, \sqrt{\alpha}y_k)$; (e) establishing an integer L and appending an L-bit string identifying a zero value to an (N−L) message bit string of an initial block, which is represented as the 0-th message block; (f) embedding the tagged message N-bit string of the 0-th block into the x-coordinate of an elliptic message point $(x_{m_0}, \sqrt{\alpha}y_{m_0})$; (g) computing a set of cipher points as $(x_{c_0}, y_{c_0}) = (x_{m_0}, y_{m_0}) + (x_{S_0}, y_{S_0})$ and $(x_{Tc_0}, \sqrt{\alpha}y_{Tc_0}) = (x_{TS_0}, \sqrt{\alpha}y_{TS_0})$ if the message point of the 0-th block is on the elliptic curve, where $\alpha_{m_0} = 1$, wherein if otherwise, the set of cipher points are computed as $(x_{Tc_0}, \sqrt{\alpha}y_{Tc_0}) = (x_{m_0}, \sqrt{\alpha}y_{m_0}) + (x_{TS_0}, \sqrt{\alpha}y_{TS_0})$ and $(x_{c_0}, y_{c_0}) = (x_{S_0}, y_{S_0})$; (h) sending appropriate bits of the x-coordinate of the cipher point $(x_{c_0}, y_{c_0})$ to the receiving correspondent, together with any other information needed to recover the message point without sacrificing security if the message point of the 0-th block is on the elliptic curve, wherein if the message point of the 0-th block is on the twist of the elliptic curve, the appropriate bits of the x-coordinate of the cipher point $(x_{Tc_0}, \sqrt{\alpha}y_{Tc_0})$ are sent to the receiving correspondent, together with any other information needed to recover the message point without sacrificing security; (i) establishing integers i and u and iteratively repeating the following steps j) through m) until i>u: (j) appending an L-bit string that identifies a value of i to the (N−L) message bit string; (k) embedding the tagged message (N−L)-bit string of the i-th block into the x-coordinate of the elliptic message point $(x_{m_i}, \sqrt{\alpha_m}y_{m_i})$; (l) computing the set of cipher points as $(x_{c_i}, y_{c_i}) = (x_{m_i}, y_{m_i}) + (x_{c_{i-1}}, y_{c_{i-1}})$ and $(x_{Tc_i}, \sqrt{\alpha_o}y_{Tc_i}) = (x_{Tc_i}, \sqrt{\alpha}y_{Tc_{i-1}})$ if the message point of the i-th block is on the elliptic curve, where $\alpha_{m_i} = 1$, wherein if otherwise, the set of cipher points are computed as $(x_{Tc_i}, \sqrt{\alpha}y_{Tc_i}) = (x_{m_i}, \sqrt{\alpha}y_{m_i}) + (x_{Tc_{i-1}}, \sqrt{\alpha}y_{Tc_{i-1}})$ and $(x_{c_i}, y_{c_i}) = (x_{c_i}, y_{c_i})$; (m) sending appropriate bits of the x-coordinate of the cipher point $(x_{c_i}, y_{c_i})$ to the receiving correspondent, together with any other information needed to recover the message point without sacrificing security if the message point of the i-th block is on the elliptic curve, wherein if the message point of the i-th block is on the twist of the elliptic curve, the appropriate bits of the x-coordinate of the cipher point $(x_{Tc_i}, \sqrt{\alpha}y_{Tc_i})$ are sent to the receiving correspondent, together with any other information needed to recover the message point without sacrificing security.

The receiving correspondent then performs the following steps: (n) embedding the bit string of the secret key into the x-coordinate of the key elliptic point $(x_k, \sqrt{\alpha_k}y_k)$; (o) computing a scalar multiplication $(x_{TS_0}, \sqrt{\alpha_o}y_{TS_0}) = (x_{TB}, \sqrt{\alpha_o}y_{TB})$ if $(x_k, \sqrt{\alpha_k}y_k)$ is on the elliptic curve, where $\alpha_k = 1$, and setting $(x_{S_0}, y_{S_0}) = (x_k, y_k)$ wherein if $\alpha_k = \overline{\alpha}$, then computing a scalar multiplication $(x_{S_0}, y_{S_0}) = k(x_B, y_B)$ and setting $(x_{TS_0}, \sqrt{\alpha}y_{TS_0}) = (x_k, \sqrt{\alpha}y_k)$; (p) computing a message point as $(x_{m_0}, y_{m_0}) = (x_{c_0}, y_{c_0}) - (x_{S_0}, y_{S_0})$ and setting $(x_{Tc_0}, \sqrt{\alpha}y_{Tc_0}) = (x_{TS_0}, \sqrt{\alpha}y_{TS_0})$ if the received cipher point of the 0-th block $(x_{c_0}, y_{c_0})$ is on the elliptic curve, wherein if the received cipher point $(x_{Tc_0}, \sqrt{\alpha}y_{Tc_0})$ is on the twist of the elliptic curve, the message point $(x_{m_0}, \sqrt{\alpha}y_{m_0})$ is computed as $(x_{m_0}, \sqrt{\alpha}y_{m_0}) = (x_{Tc_0}, \sqrt{\alpha}y_{Tc_0}) - (x_{TS_0}, \sqrt{\alpha}y_{TS_0})$ and $(x_{c_0}, y_{c_0}) = (x_{S_0}, y_{S_0})$ (q) recovering the secret message bit string of 0-th block from the x-coordinate of the point $(x_{m_0}, y_{m_0})$ if the message point is on the elliptic curve, wherein the secret message bit string of the 0-th block is recovered from the x-coordinate of the point $(x_{m_0}, \sqrt{\alpha}y_{m_0})$ if the message point is on the twist of the elliptic curve, and using any additional information received from the sending correspondent; (r) setting i=0 and iteratively repeating the following steps s) through t) until i>u: (s) computing the message point as $(x_{m_i},y_{m_i})=(x_{c_i},y_{c_i})-(x_{c_{i-1}},y_{c_{i-1}})$ and $(x_{Tc_i},\sqrt{\alpha}y_{Tc_i})=(x_{Tc_{i-1}},\sqrt{\alpha}y_{Tc_{i-1}})$ if the received cipher point of the i-th block $(x_{c_i},y_{c_i})$ is on the elliptic curve, wherein if the received cipher point $(x_{Tc_i},\sqrt{\alpha}y_{Tc_i})$ is on the twist of the elliptic curve, the message point $(x_{m_i},\sqrt{\alpha}y_{m_i})$ is computed as $(x_{m_i},\sqrt{\alpha}y_{m_i})=(x_{Tc_i},\sqrt{\alpha}y_{Tc_i})-(x_{Tc_{i-1}},\sqrt{\alpha}y_{Tc_{i-1}})$ and $(x_{c_i},y_{c_i})=(x_{c_{i-1}},y_{c_{i-1}})$; and (t) recovering the secret message bit string of i-th block from the x-coordinate of the point $(x_{m_i},y_{m_i})$ if the message point is on the elliptic curve, wherein the secret message bit string of the i-th block is recovered from the x-coordinate of the point $(x_{m_i},\sqrt{\alpha}y_{m_i})$ if the message point is on the twist of the elliptic curve, and using any additional information received from the sending correspondent.

Blind randomization may also be used with the present method. In blind randomization, the receiving correspondent does not need to know the mechanisms used by the sending correspondent to generate the random bits that are inserted in each encrypted block. In other words, there is no need to synchronize the randomization between the sending and receiving correspondent. Blind randomization will reduce the chances of collisions exploited in birthday attacks, since the same message bit string will be coded into two different cipher texts when using two different random bit strings.

In an alternative embodiment incorporating blind randomization, the cipher block chaining method includes the following steps: (a) defining a maximum block size that can be embedded into (nx+1) x-coordinates and ny y-coordinates, wherein n is an integer, and setting the maximum block size to be (nx+ny+1)N bits, wherein N is an integer; (b) a sending correspondent and a receiving correspondent agree upon the values of nx and ny, and further agree on a set of coefficients a,b∈F, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic curve $(x_B,y_B)$ ∈EC and a base point on the twist of the elliptic curve $(x_{TB},\sqrt{\alpha}y_{TB})$∈TEC, the sending and receiving correspondents further agreeing upon the number of message bits and their positions to be inserted in the N-bit blocks to be encrypted, wherein $N_m$ represents the number of bits to inserted in the N-bit block, where $N_m<N$.

The sending correspondent then performs the following steps: (c) embedding a bit string of the secret key into the x-coordinate of a key elliptic point $(x_k,\sqrt{\alpha_k}y_k)$; (d) computing a scalar multiplication $(x_{TS_0},\sqrt{\alpha}y_{TS_0})=k(x_{TB},\sqrt{\alpha}y_{TB})$ if $(x_k,\sqrt{\alpha_k}y_k)$ is on the elliptic curve, where $\alpha_k=1$, and setting $(x_{S_0},y_{S_0})=(x_k,y_k)$, wherein if $\alpha_k=\alpha_o$, then computing a scalar multiplication $(x_{S_0},y_{S_0})=k(x_B,y_B)$ and setting $(x_{TS_0},\sqrt{\alpha}y_{TS_0})=(x_k,\sqrt{\alpha}y_k)$; (e) generating $(N-N_m)$ bits at random using an $(N-N_m)$-bit random number generator and forming a block to be encrypted $B_{m_0}$ by inserting the $N_m$ message bits of the initial block and the random $(N-N_m)$ bits in the appropriate positions of the block; (f) embedding the tagged message N-bit string of an initial block, referred to as the 0-th block, into the x-coordinate of an elliptic message point $(x_{m_0},\sqrt{\alpha_{m_0}}y_{m_0})$; (g) computing a set of cipher points as $(x_{c_0},y_{c_0})=(x_{m_0},y_{m_0})+(x_{S_0},y_{S_0})$ and $(x_{Tc_0},\sqrt{\alpha}y_{Tc_0})=(x_{TS_0},\sqrt{\alpha}y_{TS_0})$ if the message point of the 0-th block is on the elliptic curve, where $\alpha_{m_0}=1$, wherein if otherwise, the set of cipher points are computed as $(x_{Tc_0},\sqrt{\alpha}y_{Tc_0})=(x_{m_0},\sqrt{\alpha}y_{m_0})+(x_{TS_0},\sqrt{\alpha}y_{TS_0})$ and $(x_{c_0},y_{c_0})=(x_{S_0},y_{S_0})$ (h) sending appropriate bits of the x-coordinate of the cipher point $(x_{c_0},y_{c_0})$ to the receiving correspondent, together with any other information needed to recover the message point without sacrificing security if the message point of the 0-th block is on the elliptic curve, wherein if the message point of the 0-th block is on the twist of the elliptic curve, the appropriate bits of the x-coordinate of the cipher point $(x_{Tc_0},\sqrt{\alpha}y_{Tc_0})$ are sent to the receiving correspondent, together with any other information needed to recover the message point without sacrificing security; (i) establishing integers i and u and iteratively repeating the following steps j) through m) until i>u: (j) generating $(N-N_m)$ bits at random using the $(N-N_m)$-bit random number generator and forming a block to be encrypted $B_{m_i}$ by inserting the $N_m$ message bits of an i-th block and the random $(N-N_m)$ bits in the appropriate positions of the block; (k) embedding the N-bit string of the i-th block $B_{m_i}$ into the x-coordinate of the elliptic message point $(x_{m_i},\sqrt{\alpha_{m_i}}y_{m_i})$; (l) computing the set of cipher points as $(x_{c_i},y_{c_i})=(x_{m_i},y_{m_i})+(x_{c_{i-1}},y_{c_{i-1}})$ and $(x_{Tc_i},\sqrt{\alpha}y_{Tc_i})=(x_{Tc_{i-1}},\sqrt{\alpha}y_{Tc_{i-1}})$ if the message point of the i-th block is on the elliptic curve, where $\alpha_{m_i}=1$, wherein if otherwise, the set of cipher points are computed as $(x_{Tc_i},\sqrt{\alpha}y_{Tc_i})=(x_{m_i},\sqrt{\alpha}y_{m_i})+(x_{Tc_{i-1}},\sqrt{\alpha}y_{Tc_{i-1}})$ and $(x_{c_i},y_{c_i})=(x_{c_i},y_{c_i})$; (m) sending appropriate bits of the x-coordinate of the cipher point $(x_{c_i},y_{c_i})$ to the receiving correspondent, together with any other information needed to recover the message point without sacrificing security if the message point of the i-th block is on the elliptic curve, wherein if the message point of the i-th block is on the twist of the elliptic curve, the appropriate bits of the x-coordinate of the cipher point $(x_{Tc_i},\sqrt{\alpha}y_{Tc_i})$ are sent to the receiving correspondent, together with any other information needed to recover the message point without sacrificing security.

The receiving correspondent then performs the following steps: (n) embedding the bit string of the secret key into the x-coordinate of the key elliptic point $(x_k,\sqrt{\alpha_k}y_k)$, (o) computing a scalar multiplication $(x_{TS_0},\sqrt{\alpha}y_{TS_0})=k(x_{TB},\sqrt{\alpha}y_{TB})$ if $(x_k,\sqrt{\alpha_k}y_k)$ is on the elliptic curve, where $\alpha_k=1$, and setting $(x_{S_0},y_{S_0})=(x_k,y_k)$, wherein if $\alpha_k=\alpha_o$, then computing a scalar multiplication $(x_{S_0},y_{S_0})=k(x_B,y_B)$ and setting $(x_{TS_0},\sqrt{\alpha}y_{TS_0})=(x_k,\sqrt{\alpha}y_k)$; (p) computing a message point as $(x_{m_0},y_{m_0})=(x_{c_0},y_{c_0})-(x_{S_0},y_{S_0})$ and setting $(x_{Tc_0},\sqrt{\alpha}y_{Tc_0})=(x_{TS_0},\sqrt{\alpha}y_{TS_0})$ if the received cipher point of the 0-th block $(x_{c_0},y_{c_0})$ is on the elliptic curve, wherein if the received cipher point $(x_{m_0},\sqrt{\alpha}y_{m_0})$ is on the twist of the elliptic curve, the message point $(x_{m_0},\sqrt{\alpha}y_{m_0})$ is computed as $(x_{m_0},\sqrt{\alpha}y_{m_0})=(x_{Tc_0},\sqrt{\alpha}y_{Tc_0})-(x_{TS_0},\sqrt{\alpha}y_{TS_0})$ and $(x_{c_0},y_{c_0})=(x_{S_0},y_{S_0})$; (q) recovering the bit string of 0-th block $B_{m_0}$ from the x-coordinate of the point $(x_{m_0},\sqrt{\alpha}y_{m_0})$ if the message point is on the elliptic curve, wherein the secret message bit string of the 0-th block is recovered from the x-coordinate of the point $(x_{m_0},\sqrt{\alpha}y_{m_0})$ if the message point is on the twist of the elliptic curve, and using any additional information received from the sending correspondent, and recovering the initial $N_m$ message bits from the bit string of $B_{m_0}$; (r) setting i=0 and iteratively repeating the following steps s) through t) until i>u: (s) computing the message point as $(x_{m_i},y_{m_i})=(x_{c_i},y_{c_i})-(x_{c_{i-1}},y_{c_{i-1}})$ and $(x_{Tc_i},\sqrt{\alpha}y_{Tc_i})=(x_{Tc_{i-1}},\sqrt{\alpha}y_{Tc_{i-1}})$ if the received cipher point of the i-th block $(x_{c_i},y_{c_i})$ is on the elliptic curve, wherein if the received cipher $(x_{Tc_i},\sqrt{\alpha}y_{Tc_i})$ is on the twist of the elliptic curve, the message point $(x_{m_i},\sqrt{\alpha}y_{m_i})$ is computed as $(x_{m_i},\sqrt{\alpha}y_{m_i})=(x_{Tc_i},\sqrt{\alpha}y_{Tc_i})-(x_{Tc_{i-1}},\sqrt{\alpha}y_{Tc_{i-1}})$ and $(x_{c_i},y_{c_i})=(x_{c_{i-1}},y_{c_{i-1}})$; and (t) recovering the bit string of i-th block $B_{m_i}$ from the x-coordinate of the point $(x_{m_i},y_{m_i})$ if the message point is on the elliptic curve, wherein the secret message bit string of the i-th block is recovered from the x-coordinate of the point $(x_{m_i},\sqrt{\alpha}y_{m_i})$ if the message point is on the twist of the elliptic curve, and using any additional information received from the sending correspondent, and recovering the $N_m$ message bits from the bit string of the i-th block $B_{m_i}$.

In an alternative embodiment of the blind randomization technique, the method includes the steps of: (a) defining a maximum block size that can be embedded into (nx+1) x-coordinates and ny y-coordinates, wherein n is an integer, and setting the maximum block size to be (nx+ny+1)N bits, wherein N is an integer; (b) a sending correspondent and a receiving correspondent agree upon the values of nx and ny, and further agree on a set of coefficients a,b∈F, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic curve $(x_B, y_B) \in EC$ and a base point on the twist of the elliptic curve $(x_{TB}, \sqrt{\overline{\alpha}} y_{TB}) \in TEC$, the sending and receiving correspondents further agreeing upon the number of message bits and their positions to be inserted in the N-bit blocks to be encrypted, and a code list for each selected number of message bits and the corresponding positions, wherein $N_e$ represents the number of bits needed to represent the code list, where $(N_m + N_e) \leq N$, $N_m$ representing the number of message bits.

The sending correspondent then performs the following steps: (c) embedding a bit string of the secret key into the x-coordinate of a key elliptic point $(x_k, \sqrt{\alpha_k} y_k)$; (d) computing a scalar multiplication $(x_{TS_0}, \sqrt{\overline{\alpha}} y_{TS_0}) = k(x_{TB}, \sqrt{\overline{\alpha}} y_{TB})$ if $(x_k, \sqrt{\alpha_k} y_k)$ is on the elliptic curve, where $\alpha_k = 1$, and setting $(x_{S_0}, y_{S_0}) = (x_k, y_k)$, wherein if $\alpha_k = \alpha_o$, then computing a scalar multiplication $(x_{S_0}, y_{S_0}) = k(x_B, y_B)$ and setting $(x_{TS_0}, \sqrt{\overline{\alpha}} y_{TS_0}) = (x_k, \sqrt{\overline{\alpha}} y_k)$; (e) selecting a code that identifies the number of message bits to be inserted in the 0-th block and generating $(N - N_m - N_e)$ bits at random using a random number generator, and further forming a block to be encrypted $B_{m_0}$ by inserting the $N_m$ message bits of the initial block and the random $(N - N_m - N_e)$ bits in the appropriate positions of the block and appending the bits $N_e$ of the code bits; (f) embedding the N-bit string of the initial block $B_{m_0}$ into the x-coordinate of an elliptic message point $(x_{m_0}, \sqrt{\alpha_{m_0}} y_{m_0})$; (g) computing a set of cipher points as $*(x_{c_0}, y_{c_0}) = (x_{m_0}, y_{m_0}) + (x_{S_0}, y_{S_0})$ and $(x_{Tc_0}, \sqrt{\overline{\alpha}} y_{Tc_0}) = (x_{TS_0}, \sqrt{\overline{\alpha}} y_{TS_0})$ if the message point of the 0-th block is on the elliptic curve, where $\alpha_{m_0} = 1$, wherein if otherwise, the set of cipher points are computed as $(x_{Tc_0}, \sqrt{\overline{\alpha}} y_{Tc_0}) = (x_{m_0}, \sqrt{\overline{\alpha}} y_{m_0}) + (x_{TS_0}, \sqrt{\overline{\alpha}} y_{TS_0})$ and $(x_{c_0}, y_{c_0}) = (x_{S_0}, y_{S_0})$; (h) sending appropriate bits of the x-coordinate of the cipher point $(x_{c_0}, y_{c_0})$ to the receiving correspondent, together with any other information needed to recover the message point without sacrificing security if the message point of the 0-th block is on the elliptic curve, wherein if the message point of the 0-th block is on the twist of the elliptic curve, the appropriate bits of the x-coordinate of the cipher point $(x_{Tc_0}, \sqrt{\overline{\alpha}} y_{Tc_0})$ are sent to the receiving correspondent, together with any other information needed to recover the message point without sacrificing security; (i) establishing integers i and u and iteratively repeating the following steps j) through m) until i>u: (j) selecting a code that identifies the number of message bits to be inserted in the 0-th block and generating $(N - N_m - N_e)$ bits at random using a random number generator, and further forming the block to be encrypted $B_{m_i}$ by inserting the $N_m$ message bits of the initial block and the random $(N - N_m - N_e)$ bits in the appropriate positions of the block and appending the bits $N_e$ of the code bits; (k) embedding the N-bit string of the i-th block $B_{m_i}$ into the x-coordinate of the elliptic message point $(x_{m_i}, \sqrt{\alpha_{m_i}} y_{m_i})$; (l) computing the set of cipher points as $(x_{c_i}, y_{c_i}) = (x_{m_i}, y_{m_i}) + (x_{c_{i-1}}, y_{c_{i-1}})$ and $(x_{Tc_i}, \sqrt{\alpha_o} y_{Tc_i}) = (x_{Tc_i}, \sqrt{\overline{\alpha}} y_{Tc_i})$ if the message point of the i-th block is on the elliptic curve, where $\alpha_{m_i} = 1$, wherein if otherwise, the set of cipher points are computed as $(x_{Tc_i}, \sqrt{\overline{\alpha}} y_{Tc_i}) = (x_{m_i}, \sqrt{\overline{\alpha}} y_{m_i}) + (x_{Tc_{i-1}}, \sqrt{\overline{\alpha}} y_{Tc_{i-1}})$ and $(x_{c_i}, y_{c_i}) = (x_{c_i}, y_{c_i})$; (m) sending appropriate bits of the x-coordinate of the cipher point $(x_{c_i}, y_{c_i})$ to the receiving correspondent, together with any other information needed to recover the message point without sacrificing security if the message point of the i-th block is on the elliptic curve, wherein if the message point of the i-th block is on the twist of the elliptic curve, the appropriate bits of the x-coordinate of the cipher point $(x_{Tc_i}, \sqrt{\overline{\alpha}} y_{Tc_i})$ are sent to the receiving correspondent, together with any other information needed to recover the message point without sacrificing security.

The receiving correspondent then performs the following steps: (n) embedding the bit string of the secret key into the x-coordinate of the key elliptic point $(x_k, \sqrt{\alpha_k} y_k)$; (o) computing a scalar multiplication $(x_{TS_0}, \sqrt{\overline{\alpha}} y_{TS_0}) = k(x_{TB}, \sqrt{\overline{\alpha}} y_{TB})$ if $(x_k, \sqrt{\alpha_k} y_k)$ is on the elliptic curve, where $\alpha_k = 1$, and setting $(x_{S_0}, y_{S_0}) = (x_k, y_k)$, wherein if $\alpha_k = \alpha_o$, then computing a scalar multiplication $(x_{S_0}, y_{S_0}) = k(x_B, y_B)$ and setting $(x_{TS_0}, \sqrt{\overline{\alpha}} y_{TS_0}) = (x_k, \sqrt{\overline{\alpha}} y_k)$; (p) computing a message point as $(x_{m_0}, y_{m_0}) = (x_{c_0}, y_{c_0}) + (x_{S_0}, y_{S_0})$ and setting $(x_{Tc_0}, \sqrt{\overline{\alpha}} y_{Tc_0}) = (x_{TS_0}, \sqrt{\overline{\alpha}} y_{TS_0})$ if the received cipher point of the 0-th block $(x_{c_0}, y_{c_0})$ is on the elliptic curve, wherein if the received cipher point $(x_{Tc_0}, \sqrt{\overline{\alpha}} y_{Tc_0})$ is on the twist of the elliptic curve, the message point $(x_{m_0}, \sqrt{\overline{\alpha}} y_{m_0})$ is computed as $(x_{m_0}, \sqrt{\overline{\alpha}} y_{m_0}) = (x_{Tc_0}, \sqrt{\overline{\alpha}} y_{Tc_0}) - (x_{TS_0}, \sqrt{\overline{\alpha}} y_{TS_0})$ and $(x_{c_0}, y_{c_0}) = (x_{S_0}, y_{S_0})$; (q) recovering the bit string of 0-th block $B_{m_0}$ from the x-coordinate of the point $(x_{m_0}, y_{m_0})$ if the message point is on the elliptic curve, wherein the secret message bit string of the 0-th block is recovered from the x-coordinate of the point $(x_{m_0}, \sqrt{\overline{\alpha}} y_{m_0})$ if the message point is on the twist of the elliptic curve, and using any additional information received from the sending correspondent, and recovering the initial $N_m$ message bits from the bit string of $B_{m_0}$; (r) setting i=0 and iteratively repeating the following steps s) through t) until i>u: (s) computing the message point as $(x_{m_i}, y_{m_i}) = (x_{c_i}, y_{c_i}) - (x_{c_{i-1}}, y_{c_{i-1}})$ and $(x_{Tc_i}, \sqrt{\overline{\alpha}} y_{Tc_i}) = (x_{Tc_{i-1}}, \sqrt{\overline{\alpha}} y_{Tc_{i-1}})$ if the received cipher point of the i-th block $(x_{Tc_i}, y_{Tc_i})$ is on the elliptic curve, wherein if the received cipher point $(x_{Tc_i}, \sqrt{\overline{\alpha}} y_{Tc_i})$ is on the twist of the elliptic curve, the message point $(x_{m_i}, \sqrt{\overline{\alpha}} y_{m_i})$ is computed as $(x_{m_i}, \sqrt{\overline{\alpha}} y_{m_i}) = (x_{Tc_i}, \sqrt{\overline{\alpha}} y_{Tc_i}) - (x_{Tc_{i-1}}, \sqrt{\overline{\alpha}} y_{Tc_{i-1}})$ and =; and (t) recovering the bit string of i-th block $B_{m_i}$ from the x-coordinate of the point $(x_{m_0}, y_{m_i})$ if the message point is on the elliptic curve, wherein the secret message bit string of the i-th block is recovered from the x-coordinate of the point $(x_{m_i}, \sqrt{\overline{\alpha}} y_{m_i})$ if the message point is on the twist of the elliptic curve, and using any additional information received from the sending correspondent, and recovering the $N_m$ message bits from the bit string of the i-th block $B_{m_i}$.

As noted above, the methods include data embedding. In order to embed a message bit string into a point $(x, \sqrt{\overline{\alpha}} y)$ which satisfies either an elliptic curve equation $y^2 = x^3 + ax + b$ or its twist, $\overline{\alpha} y^2 = x^3 + ax + b$, the message bit string is first divided into N-bit strings and the lth block is denoted as $m_i$. Following this, the value of the bit string of $m_i$ is assigned to $x_{m_i}$, and the values of $x_{m_i}$ are substituted and the value of $t_{m_i}$ is computed using $t_{m_i} = x_{m_i}^3 + ax_{m_i} + b$.

If $t_{m_i}$ is quadratic residue, then $y_{m_i} = \sqrt{t_{m_i}}$ and the point is given as $(x_{m_i}, y_{m_i})$. However, if $t_{m_i}$ is non-quadratic residue, then $$y_{m_i} = \sqrt{\frac{t_{m_i}}{\alpha}}$$

and the point is given as $(x_{m_i}, \sqrt{\alpha} y_{m_i})$. The message point is then denoted as $(x_{m_i}, \sqrt{\alpha_{m_i}} y_{m_i})$, where the point is on the elliptic curve if $\alpha_{m_i} = 1$, and the point is on the twist if $\alpha_{m_i} = \overline{\alpha}$.

Alternatively, data embedding may be performed as follows: (a) dividing the message bit string into (nx+ny+1) bit-strings $m_{x,0}, m_{x,1}, \ldots, m_{x,nx}, m_{y,1}, \ldots, m_{k,ny}$, (b) assigning the value of the bit string of $m_{x,0}, m_{x,1}, \ldots, m_{x,nx}$ to $x_{0,m}, x_{1,m}, \ldots, x_{nx,m}$; (c) assigning the value of the bit string of $m_{y,1} \ldots, m_{k,ny}$ to $y_{1,m}, \ldots y_{ny,m}$; (d) computing $$T^{(s-1)} = \sum_{l \in S_{nx}} b_{1l} x_l^3 + \sum_{l,k \in S_{nx}, l \neq k} b_{2lk} x_l^2 x_k;$$

and (e) performing a Legendre test to determine if T has a square root, wherein if T has a square root, then assigning the square root to $y_0$, and if T does not have a square root, then the x-coordinates and y-coordinates of the elliptic curve point with the embedded shared secret key bit string are selected as $gx_{i,m}$ and $$g^{\frac{3}{2}} y_{i,m},$$

respectively, where g is non-quadratic residue in F.

As a hybrid of these techniques, the embedding may be performed as: (a) dividing the message bit string into N-bit strings, wherein the i-th block is given by $m_i$; (b) assigning the value of the bit string of $m_i$ to $x_{m_i}$; (c) substituting the values of $x_{m_i}$, and computing a residue value $t_{m_i}$ as $t_{m_i} = x_{m_i}^3 + ax_{m_i} + b$, wherein if $t_{m_i}$ is quadratic residue such that $y_{m_i} = \sqrt{t_{m_i}}$, then the message point is embedded as $(x_{m_i}, y_{m_i})$ and if $t_{m_i}$ is non-quadratic residue such that $$y_{m_i} = \sqrt{\frac{t_{m_i}}{\alpha}},$$

then the message point is embedded $(x_{m_i}, \sqrt{\alpha} y_{m_i})$.

The Legendre Symbol is used to test whether an element of F(p) has a square root or not, i.e., whether an element is quadratic residue or not. The Legendre Symbol and test are as follows. Given an element of a finite field F(p), such as d, the Legendre symbol is defined as $$\left(\frac{d}{p}\right).$$

In order to test whether d is quadratic residue or not, the Legendre symbol, $$\left(\frac{d}{p}\right),$$

is computed such that $$\left(\frac{d}{p}\right) = \begin{cases} +1 & \text{if } x \text{ is quadratic residue} \\ 0 & \text{if } x \equiv 0 \bmod F(p) \\ -1 & \text{otherwise.} \end{cases}$$

In the above, the password protocols use the scalar multiplication $k_m(x_{Pu}, y_{Pu})$. It should be noted that, in order to find a collision means, that there are two message bits strings m and m' such that their integer values $k_m$ and $k_{m'}$ will lead to $k_m k(x_B, y_B) = k_{m'} k(x_B, y_B)$. This collision implies that integers can be found such that $k_m k - k_{m'} k = l \ast \#EC$, where #EC is the order of the group (EC,+). This is equivalent to solving the elliptic curve discrete logarithm problem. This also applies to finding a collision for the points on the twist of an elliptic curve, $k_m k(x_{TB}, \sqrt{\alpha} y_{TB}) = k_{m'}(x_{TB}, \sqrt{\alpha} y_{TB})$.

Thus, security of the password protocols depends on the security of the underlying elliptic curve cryptography. The security of elliptic curve cryptosystems is assessed by both the effect on the solution of the elliptic curve discrete logarithmic problem (ECDLP) and power analysis attacks.

It is well known that the elliptic curve discrete logarithm problem (ECDLP) is apparently intractable for non-singular elliptic curves. The ECDLP problem can be stated as follows: given an elliptic curve defined over F that needs N-bits for the representation of its elements, an elliptic curve point $(x_p, y_p) \in EC$, defined in affine coordinates, and a point $(x_Q, y_Q) \in EC$, defined in affine coordinates, determine the integer, such that $(x_Q, y_Q) = k(x_p, y_p)$, provided that such an integer exists. In the below, it is assumed that such an integer exists.

The most well known attack used against the ECDLP is the Pollard p-method, which has a complexity of $O(\sqrt{\pi K}/2)$, where K is the order of the underlying group, and the complexity is measured in terms of an elliptic curve point addition.

Since the underlying cryptographic problems used in the above block cipher chaining methods is the discrete logarithm problem, which is a known difficult mathematical problem, it is expected that the security of the above methods are more secure than prior art ciphers which are not based on such a mathematically difficult problem.

Projective coordinate can also be used by the sending correspondent and the receiving correspondent to embed extra message data bits in the projective coordinate wherein the addition of the corresponding elliptic points is defined in (nx+ny+3) dimensional space where there are (nx+1) x-coordinates, (ny+1) y-coordinates and one projective coordinate.

The equations for the addition rule can be obtained by using the elliptic curve equation with (nx+1) x-coordinates and (nx+1) y-coordinates in projective coordinates and substituting a straight line equation to obtain a cubic equation in terms of one of the x-coordinates. This cubic equation can be used to identify the third point of intersection between a straight line and the elliptic curve in (nx+ny+3) dimensions given two other intersection points. This third point of intersection is used to identify the sum of the given two points.

It should be understood that the calculations may be performed by any suitable computer system, such as that diagrammatically shown in the sole drawing FIGURE. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MD. Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A computerized method of cipher block chaining using elliptic curve cryptography, comprising the steps of:

(a) defining a maximum block size that can be embedded into (nx+1) x-coordinates and ny y-coordinates, wherein n is an integer, and setting the maximum block size to be (nx+ny+1)N bits, wherein N is an integer;

(b) a sending correspondent and a receiving correspondent agree upon the values of nx and ny, and further agree on a set of coefficients a,b∈F, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic curve $(x_B, y_B) \in EC$ and a base point on the twist of the elliptic curve $(x_{TB}, \sqrt{\overline{\alpha}}y_{TB}) \in TEC$;

the sending correspondent then performs the following steps:

(c) embedding a bit string of the secret key into the x-coordinate of a key elliptic point $(x_k, \sqrt{\alpha_k}y_k)$;

(d) computing a scalar multiplication $(x_{TS_0}, \sqrt{\overline{\alpha}}y_{TS_0}) = k(x_{TB}, \sqrt{\overline{\alpha}}y_{TB})$ if $(x_k, \sqrt{\alpha_k}y_k)$ is on the elliptic curve, where $\alpha_k = 1$, and setting $(x_{S_0}, y_{S_0}) = (x_k, y_k)$, wherein if $\alpha_k = \alpha_o$, then computing a scalar multiplication $(x_{S_0}, y_{S_0}) = k(x_B, y_B)$ and setting $(x_{TS_0}, \sqrt{\overline{\alpha}}y_{TS_0}) = (x_k, \sqrt{\overline{\alpha}}y_k)$;

(e) embedding the message N-bit string of a 0-th block into the x-coordinate of an elliptic message point $(x_{m_0}, \sqrt{\alpha_{m_0}}y_{m_0})$;

(f) computing a set of cipher points as $(x_{c_0}, y_{c_0}) = (x_{m_0}, y_{m_0}) + (x_{S_0}, y_{S_0})$ and $(x_{Tc_0}, \sqrt{\overline{\alpha}}y_{Tc_0}) = (x_{TS_0}, \sqrt{\overline{\alpha}}y_{TS_0})$ if the message point of the 0-th block is on the elliptic curve, where $\alpha_{m_0} = 1$, wherein if otherwise, the set of cipher points are computed as $(x_{Tc_0}, \sqrt{\overline{\alpha}}y_{Tc_0}) = (x_{m_0}, \sqrt{\overline{\alpha}}y_{m_0}) + (x_{TS_0}, \sqrt{\overline{\alpha}}y_{TS_0})$ and $(x_{c_0}, y_{c_0}) = (x_{S_0}, y_{S_0})$;

(g) sending appropriate bits of the x-coordinate of the cipher point $(x_{c_0}, y_{c_0})$ to the receiving correspondent if the message point of the 0-th block is on the elliptic curve, wherein if the message point of the 0-th block is on the twist of the elliptic curve, the appropriate bits of the x-coordinate of the cipher point $(x_{Tc_0}, \sqrt{\overline{\alpha}}y_{Tc_0})$ are sent to the receiving correspondent;

(h) establishing integers i and u and iteratively repeating the following steps i) through k) until i>u:

(i) embedding the message N-bit string of an i-th block into the x-coordinate of the elliptic message point $(x_{m_i}, \sqrt{\alpha_{m_i}}y_{m_i})$;

(j) computing the set of cipher points as $(x_{c_i}, y_{c_i}) = (x_{m_i}, y_{m_i}) + (x_i, y_{S_0})$ and $(x_{Tc_i}, \sqrt{\overline{\alpha}}y_{Tc_i}) = (x_{Tc_{i-1}}, \sqrt{\overline{\alpha}}y_{Tc_{i-1}})$ if the message point of the i-th block is on the elliptic curve, where $\alpha_{m_i} = 1$, wherein if otherwise, the set of cipher points are computed as $(x_{Tc_i}, \sqrt{\overline{\alpha}}y_{Tc_i}) = (x_{m_i}, \sqrt{\overline{\alpha}}y_{m_i}) + (x_{Tc_{i-1}}, \sqrt{\overline{\alpha}}y_{Tc_{i-1}})$ and $(x_{c_i}, y_{c_i}) = (x_{c_i}, y_{c_i})$;

(k) sending appropriate bits of the x-coordinate of the cipher point $(x_{c_i}, y_{c_i})$ to the receiving correspondent if the message point of the i-th block is on the elliptic curve, wherein if the message point of the i-th block is on the twist of the elliptic curve, the appropriate bits of the x-coordinate of the cipher point $(x_{Tc_i}, \sqrt{\overline{\alpha}}y_{Tc_i})$ are sent to the receiving correspondent;

the receiving correspondent then performs the following steps:

(l) embedding the bit string of the secret key into the x-coordinate of the key elliptic point $(x_k, \sqrt{\alpha_k}y_k)$;

(m) computing a scalar multiplication $(x_{TS_0}, \sqrt{\overline{\alpha}}y_{TS_0}) = k(x_{TB}, \sqrt{\overline{\alpha}}y_{TB})$ if $(x_k, \sqrt{\alpha_k}y_k)$ is on the elliptic curve, where $\alpha_k = 1$, and setting $(x_{S_0}, y_{S_0}) = (x_k, y_k)$, wherein if $\alpha_k = \overline{\alpha}$, then computing a scalar multiplication $(x_{S_0}, y_{S_0}) = k(x_B, y_B)$ and setting $(x_{TS_0}, \sqrt{\overline{\alpha}}y_{TS_0}) = (x_k, \sqrt{\overline{\alpha}}y_k)$;

(n) computing a message point as $(x_{m_0}, y_{m_0}) = (x_{c_0}, y_{c_0}) - (x_{S_0}, y_{S_0})$ and setting $(x_{Tc_0}, \sqrt{\overline{\alpha}}y_{Tc_0}) = (x_{TS_0}, \sqrt{\overline{\alpha}}y_{TS_0})$ if the received cipher point of the 0-th block $(x_{c_0}, y_{c_0})$ is on the elliptic curve, wherein if the received cipher point $(x_{Tc_0}, \sqrt{\overline{\alpha}}y_{Tc_0})$ is on the twist of the elliptic curve, the message point $(x_{m_0}, \sqrt{\overline{\alpha}}y_{m_0})$ is computed as $(x_{m_0}, \sqrt{\overline{\alpha}}y_{m_0}) = (x_{Tc_0}, \sqrt{\overline{\alpha}}y_{Tc_0}) - (x_{TS_0}, \sqrt{\overline{\alpha}}y_{TS_0})$ and $(x_{c_0}, y_{c_0}) = (x_{S_0}, y_{S_0})$;

(o) recovering the secret message bit string of 0-th block from the x-coordinate of the point $(x_{m_0}, y_{m_0})$ if the message point is on the elliptic curve, wherein the secret message bit string of the 0-th block is recovered from the x-coordinate of the point $(x_{m_0}, \sqrt{\overline{\alpha}}y_{m_0})$ if the message point is on the twist of the elliptic curve;

(p) setting i=0 and iteratively repeating the following steps q) through r) until i>u:

(q) computing the message point as $(x_{m_i}, y_{m_i}) = (x_{c_i}, y_{c_i}) - (x_{c_{i-1}}, y_{c_{i-1}})$ and $(x_{Tc_i}, \sqrt{\overline{\alpha}}y_{Tc_i}) = (x_{Tc_{i-1}}, \sqrt{\overline{\alpha}}y_{Tc_{i-1}})$ if the received cipher point of the i-th block $(x_{c_i}, y_{c_i})$ is on the elliptic curve, wherein if the received cipher point $(x_{Tc_i}, \sqrt{\overline{\alpha}}y_{Tc_i})$ is on the twist of the elliptic curve, the message point $(x_{m_i}, \sqrt{\overline{\alpha}}y_{m_i})$ is computed as $(x_{m_i}, \sqrt{\overline{\alpha}}y_{m_i}) = (x_{Tc_i}, \sqrt{\overline{\alpha}}y_{Tc_i}) - (x_{Tc_{i-1}}, \sqrt{\overline{\alpha}}y_{Tc_{i-1}})$ and $(x_{c_i}, y_{c_i}) = (x_{c_{i-1}}, y_{c_{i-1}})$; and (r) recovering the secret message bit string of i-th block from the x-coordinate of the point $(x_{m_i}, y_{m_i})$ if the message point is on the elliptic curve, wherein the secret message bit string of the i-th block is recovered from the x-coordinate of the point $(x_{m_i}, \sqrt{\overline{\alpha}}y_{m_i})$ if the message point is on the twist of the elliptic curve.

2. The computerized method of cipher block chaining using elliptic curve cryptography as recited in claim 1, wherein the step of embedding includes the steps of:

(a) dividing the message bit string into N-bit strings, wherein the i-th block is given by $m_i$;

(b) assigning the value of the bit string of $m_i$ to $x_{m_i}$;

(c) substituting the values of $x_{m_i}$ and computing a residue value $t_{m_i}$ as $t_{m_i} = x_{m_i}^3 + ax_{m_i} + b$, wherein if $t_{m_i}$ is quadratic residue such that $y_{m_i} = \sqrt{t_{m_i}}$, then the message point is embedded as $(x_{m_i}, y_{m_i})$, and if $t_{m_i}$ is non-quadratic residue such that $$y_{m_i} = \sqrt{\frac{t_{m_i}}{\alpha}},$$

then the message point is embedded $(x_{m_i}, \sqrt{\alpha} y_{m_i})$.

3. A computerized method of cipher block chaining using elliptic curve cryptography, comprising the steps of:
   (a) defining a maximum block size that can be embedded into (nx+1) x-coordinates and ny y-coordinates, wherein n is an integer, and setting the maximum block size to be (nx+ny+1)N bits, wherein N is an integer;
   (b) a sending correspondent and a receiving correspondent agree upon the values of nx and ny, and further agree on a set of coefficients a,b∈F, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic curve $(x_B, y_B) \in EC$ and a base point on the twist of the elliptic curve $(X_{TB}, \sqrt{\alpha} y_{TB}) \in TEC$;
   the sending correspondent then performs the following steps:
   (c) embedding a bit string of the secret key into the x-coordinate of a key elliptic point $(x_k, \sqrt{\alpha_k} y_k)$;
   (d) computing a scalar multiplication $(x_{TS_0}, \sqrt{\alpha} y_{TS_0}) = k(x_{TB}, \sqrt{\alpha} y_{TB})$ if $(x_k, \sqrt{\alpha_k} y_k)$ is on the elliptic curve, where $\alpha_k = 1$, and setting $(x_{S_0}, y_{S_0}) = (x_k, y_k)$ wherein if $\alpha_k = \overline{\alpha}$, then computing a scalar multiplication $(x_{S_0}, y_{S_0}) = k(x_B, y_B)$ and setting $(x_{TS_0}, \sqrt{\alpha} y_{TS_0}) = (x_k, \sqrt{\alpha} y_k)$;
   (e) embedding the message N-bit string of an initial block, which is referred to as the 0-th block, into the x-coordinate of an elliptic message point $(x_{m_0}, \sqrt{\alpha_{m_0}} y_{m_0})$;
   (f) computing a set of cipher points as $(x_{c_0}, y_{c_0}) = (x_{m_0}, y_{m_0}) + (x_{S_0}, y_{S_0})$ and $(x_{Tc_0}, \sqrt{\alpha} y_{Tc_0}) = (x_{TS_0}, \sqrt{\alpha} y_{TS_0})$ if the message point of the 0-th block is on the elliptic curve, where $\alpha_{m_0} = 1$, wherein if otherwise, the set of cipher points are computed as $(x_{Tc_0}, \sqrt{\alpha} y_{Tc_0}) = (x_{m_0}, \sqrt{\alpha} y_{m_0}) + (x_{TS_0}, \sqrt{\alpha} y_{TS_0})$ and $(x_{c_0}, y_{c_0}) = (x_{S_0}, y_{S_0})$;
   (g) sending appropriate bits of the x-coordinate of the cipher point $(x_{c_0}, y_{c_0})$ to the receiving correspondent if the message point of the 0-th block is on the elliptic curve, wherein if the message point of the 0-th block is on the twist of the elliptic curve, the appropriate bits of the x-coordinate of the cipher point $(x_{Tc_0}, \sqrt{\alpha} y_{Tc_0})$ are sent to the receiving correspondent;
   (h) establishing integers i and u and iteratively repeating the following steps i) through l) until u:
   (i) embedding the message N-bit string of an i-th block into the x-coordinate of the elliptic message point $(x_{m_i}, \sqrt{\alpha_{m_i}} y_{m_i})$;
   (j) doubling the points $(x_{S_i}, y_{S_i})$ and $(x_{TS_i}, y_{TS_i})$ as $(x_{S_i}, y_{S_i}) = 2(x_{S_{i-1}}, y_{S_{i-1}})$ and $(x_{TS_i}, y_{TS_i}) = 2(x_{TS_{i-1}}, \sqrt{\alpha} y_{TS_{i-1}})$ respectively;
   (k) computing the set of cipher points as $(x_{c_i}, y_{c_i}) = (x_{m_i}, y_{m_i}) + (x_{m_{i-1}}, y_{m_{i-1}}) + (x_{S_i}, y_{S_i})$ and $(x_{Tc_i}, \sqrt{\alpha} y_{Tc_i}) = (x_{TS_i}, \sqrt{\alpha} y_{TS_i})$ if the message point of the i-th block is on the elliptic curve, where $\alpha_{m_i} = 1$, wherein if otherwise, the set of cipher points are computed as $(x_{Tc_i}, \sqrt{\alpha} y_{Tc_i}) = (x_{m_i}, \sqrt{\alpha} y_{m_i}) + (x_{m_{i-1}}, \sqrt{\alpha} y_{m_{i-1}}) + (x_{TS_i}, \sqrt{\alpha} y_{TS_i})$ and $(x_{c_i}, y_{c_i}) = (x_{S_i}, y_{S_i})$;
   (l) sending appropriate bits of the x-coordinate of the cipher point $(x_{c_i}, y_{c_i})$ to the receiving correspondent if the message point of the i-th block is on the elliptic curve, wherein if the message point of the i-th block is on the twist of the elliptic curve, the appropriate bits of the x-coordinate of the cipher point $(x_{Tc_i}, \sqrt{\alpha} y_{Tc_i})$ are sent to the receiving correspondent;
   the receiving correspondent then performs the following steps:
   (m) embedding the bit string of the secret key into the x-coordinate of the key elliptic point $(x_k, \sqrt{\alpha_k} y_k)$;
   (n) computing a scalar multiplication $(x_{TS_0}, \sqrt{\alpha} y_{TS_0}) = k(x_{TB}, \sqrt{\alpha} y_{TB})$ if $(x_k, \sqrt{\alpha_k} y_k)$ is on the elliptic curve, where $\alpha_k = 1$, and setting $(x_{S_0}, y_{S_0}) = (x_k, y_k)$, wherein if $\alpha_k = \alpha_o$, then computing a scalar multiplication $(x_{S_0}, y_{S_0}) = k(x_B, y_B)$ and setting $(x_{TS_0}, \sqrt{\alpha} y_{TS_0}) = (x_k, \sqrt{\alpha} y_k)$;
   (o) computing a message point as $(x_{m_0}, y_{m_0}) = (x_{c_0}, y_{c_0}) - (x_{S_0}, y_{S_0})$ and setting $(x_{Tc_0}, \sqrt{\alpha} y_{Tc_0}) = (x_{TS_0}, \sqrt{\alpha} y_{TS_0})$ if the received cipher point of the 0-th block $(x_{c_0}, y_{c_0})$ is on the elliptic curve, wherein if the received cipher point $(x_{Tc_0}, \sqrt{\alpha} y_{Tc_0})$ is on the twist of the elliptic curve, the message point $(x_{m_0}, \sqrt{\alpha} y_{m_0})$ is computed as $(x_{m_0}, \sqrt{\alpha} y_{m_0}) = (x_{Tc_0}, \sqrt{\alpha} y_{Tc_0}) - (x_{TS_0}, \sqrt{\alpha} y_{TS_0})$ and $(x_{c_0}, y_{c_0}) = (x_{S_0}, y_{S_0})$;
   (p) recovering the secret message bit string of 0-th block from the x-coordinate of the point $(x_{m_0}, y_{c_0})$ if the message point is on the elliptic curve, wherein the secret message bit string of the 0-th block is recovered from the x-coordinate of the point $(x_{m_0}, \sqrt{\alpha} y_{m_0})$ if the message point is on the twist of the elliptic curve;
   (q) setting i=0 and iteratively repeating the following steps r) through t) until i>u:
   (r) doubling the points $(x_{S_i}, y_{S_i})$ and $(x_{TS_0}, y_{TS_i})$ as $(x_{S_i}, y_{S_i}) = 2(x_{S_{i-1}}, y_{S_{i-1}})$ and $(x_{TS_i}, y_{TS_i}) = 2(x_{TS_{i-1}}, \sqrt{\alpha} y_{TS_{i-1}})$ respectively;
   (s) computing the message point as $(x_{m_i}, y_{m_i}) = (x_{c_i}, y_{c_i}) - (x_{m_{i-1}}, y_{m_{i-1}}) - (x_{S_i}, y_{S_i})$ and $(x_{Tc_i}, \sqrt{\alpha} y_{TS_i}) = (x_{TS_i}, \sqrt{\alpha} y_{TS_i})$ if the received cipher point of the i-th block $(x_{c_i}, y_{c_i})$ is on the elliptic curve, wherein if the received cipher point $(x_{Tc_i}, \sqrt{\alpha} y_{Tc_i})$ is on the twist of the elliptic curve, the message point $(x_{m_i}, \sqrt{\alpha} y_{m_i})$ is computed as $(x_{m_i}, \sqrt{\alpha} y_{m_i}) = (x_{Tc_i}, \sqrt{\alpha} y_{Tc_i}) - (x_{m_{i-1}}, \sqrt{\alpha} y_{m_{i-1}}) - (x_{TS_i}, \sqrt{\alpha} y_{TS_i})$ and $(x_{c_i}, y_{c_i}) = (x_{S_i}, y_{S_i})$; and
   (t) recovering the secret message bit string of i-th block from the x-coordinate of the point $(x_{m_i}, y_{m_i})$ if the message point is on the elliptic curve, wherein the secret message bit string of the i-th block is recovered from the x-coordinate of the point $(x_{m_i}, \sqrt{\alpha} y_{m_i})$ if the message point is on the twist of the elliptic curve.

4. The computerized method of cipher block chaining using elliptic curve cryptography as recited in claim 3, wherein the step of embedding includes the steps of:
   (a) dividing the message bit string into N-bit strings, wherein the i-th block is given by $m_i$;
   (b) assigning the value of the bit string of $m_i$ to $x_{m_i}$;
   (c) substituting the values of $x_{m_i}$ and computing a residue value $t_{m_i}$ as $t_{m_i} = x_{m_i}^3 + ax_{m_i} + b$, wherein if $t_{m_i}$ is quadratic residue such that $y_{m_i} = \sqrt{t_{m_i}}$, then the message point is embedded as $(x_{m_i}, y_{m_i})$, and if $t_{m_i}$ is non-quadratic residue such that $$y_{m_i} = \sqrt{\frac{t_{m_i}}{\alpha}},$$

then the message point is embedded $(x_{m_i}, \sqrt{\alpha} y_{m_i})$.

5. A computerized method of cipher block chaining using elliptic curve cryptography, comprising the steps of:
   (a) defining a maximum block size that can be embedded into (nx+1) x-coordinates and ny y-coordinates, wherein n is an integer, and setting the maximum block size to be $(n_x+n_y+1)N$ bits, wherein N is an integer;

(b) a sending correspondent and a receiving correspondent agree upon the values of $n_x$ and $n_y$, and further agree on a set of coefficients $a, b \in F$, wherein F represents a finite field where the field's elements can be represented in N-bits, the sending and receiving correspondents further agreeing on a random number k, wherein the random number k is a shared secret key for communication, the sending and receiving correspondents further agreeing on a base point on an elliptic curve $(x_B, y_B) \in EC$ and a base point on the twist of the elliptic curve $(x_{TB}, \sqrt{\alpha} y_{TB}) \in TEC$, the sending and receiving correspondents further agreeing upon the number of message bits and their positions to be inserted in the N-bit blocks to be encrypted, wherein $N_m$ represents the number of bits to inserted in the N-b t block, where $N_m < N$;

the sending correspondent then performs the following steps:

(c) embedding a bit string of the secret key into the x-coordinate of a key elliptic point $(x_k, \sqrt{\alpha_k} y_k)$;

(d) computing a scalar multiplication $(x_{TS_0}, \sqrt{\alpha} y_{TS_0}) = k(x_{TB}, \sqrt{\alpha} y_{TB})$ if $(x_k, \sqrt{\alpha_k} y_k)$ is on the elliptic curve, where $\alpha_k=1$, and setting $(x_{S_0}, y_{S_0}) = (x_k, y_k)$, wherein if $\alpha_k = \alpha_o$, then computing a scalar multiplication $(x_{S_0}, y_{S_0}) = (x_B, y_B)$ and setting $(x_{TS_0}, \sqrt{\alpha} y_{TS_0}) = (x_k, \sqrt{\alpha} y_k)$;

(e) generating $(N-N_m)$ bits at random using an $(N-N_m)$-bit random number generator and forming a block to be encrypted $B_{m_0}$ by inserting the $N_m$ message bits of the initial block and the random $(N-N_m)$ bits in the appropriate positions of the block;

(f) embedding the tagged message N-bit string of a 0-th block into the x-coordinate of an elliptic message point $(x_{m_0}, \sqrt{\alpha_{m_0}} y_{m_0})$;

(g) computing a set of cipher points as $(x_{c_o}, y_{c_o}) = (x_{m_0}, y_{m_0}) + (x_{S_o}, y_{S_o})$ and $(x_{Tc_0}, \sqrt{\alpha} y_{Tc_0}) = (x_{TS_0}, \sqrt{\alpha} y_{TS_0})$ if the message point of the 0-th block is on the elliptic curve, where $\alpha_{m_0}=1$, wherein if otherwise, the set of cipher points are computed as $(x_{Tc_0}, \sqrt{\alpha} y_{Tc_0}) = (x_{m_0}, \sqrt{\alpha} y_{m_0}) + (x_{TS_0}, \sqrt{\alpha} y_{TS_0})$ and $(x_{c_0}, y_{c_0}) = (x_{S_0}, y_{S_0})$;

(h) sending appropriate bits of the x-coordinate of the cipher point $(x_{c_0}, y_{c_0})$ to the receiving correspondent if the message point of the 0-th block is on the elliptic curve, wherein if the message point of the 0-th block is on the twist of the elliptic curve, the appropriate bits of the x-coordinate of the cipher point $(x_{Tc_0}, \sqrt{\alpha} y_{Tc_0})$ are sent to the receiving correspondent;

(i) establishing integers i and u and iteratively repeating the following steps (j) through (m) until i>u:

(j) generating $(N-N_m)$ bits at random using the $(N-N_m)$-bit random number generator and forming a block to be encrypted $B_{m_i}$ by inserting the $N_m$ message bits of an i-th block and the random $(N-N_m)$ bits in the appropriate positions of the block;

(k) embedding the N-bit string of the i-th block $B_{m_i}$ into the x-coordinate of the elliptic message point $(z_{m_i}, \sqrt{\alpha_{m_i}} y_{m_i})$;

(l) computing the set of cipher points as $(x_{c_i}, y_{c_i}) = (x_{m_i}, y_{m_i}) + (x_{c_{i-1}}, y_{c_{i-1}})$ and $(x_{Tc_i}, \sqrt{\alpha} y_{Tc_i}) = (x_{Tc_0}, \sqrt{\alpha} y_{Tc_0})$ if the message point of the i-th block is on the elliptic curve, where $\alpha_{m_i}=1$, wherein if otherwise, the set of cipher points are computed as $(x_{Tc_i}, \sqrt{\alpha} y_{Tc_i}) = (x_{m_i}, \sqrt{\alpha} y_{m_i}) + (x_{Tc_{i-1}}, \sqrt{\alpha} y_{Tc_{i-1}})$ and $(x_{c_i}, y_{c_i}) = (x_{c_{i-1}}, y_{c_{i-1}})$;

(m) sending appropriate bits of the x-coordinate of the cipher point $(x_{c_i}, y_{c_i})$ to the receiving correspondent if the message point of the i-th block is on the elliptic curve, wherein if the message point of the i-th block is on the twist of the elliptic curve, the appropriate bits of the x-coordinate of the cipher point $(x_{Tc_i}, \sqrt{\alpha} y_{Tc_i})$ are sent to the receiving correspondent;

the receiving correspondent then performs the following steps:

(n) embedding the bit string of the secret key into the x-coordinate of the key elliptic point $(x_k, \sqrt{\alpha_k} y_k)$;

(o) computing a scalar multiplication $(x_{TS_0}, \sqrt{\alpha} y_{TS_0}) = (x_{TB}, \sqrt{\alpha} y_{TB})$ if $(x_k, \sqrt{\alpha_k} y_k)$ is on the elliptic curve, where $\alpha_k=1$, and setting $(x_{S_0}, y_{S_0}) = (x_k, y_k)$, wherein if $\alpha_k = \alpha_o$, then computing a scalar multiplication $(x_{S_0}, y_{S_0}) = (x_B, y_B)$ and setting $(x_{TS_0}, \sqrt{\alpha} y_{TS_0}) = (x_k, \sqrt{\alpha} y_k)$;

(p) computing a message point as $(x_{m_0}, y_{m_0}) = (x_{c_0}, y_{c_0}) - (x_{S_0}, y_{S_0})$ and setting $(x_{Tc_0}, \sqrt{\alpha} y_{Tc_0}) = (x_{Tc_0}, \sqrt{\alpha} y_{Tc_0})$ if the received cipher point of the 0-th block $(x_{c_0}, y_{c_0})$ is on the elliptic curve, wherein if the received cipher point $(x_{Tc_0}, \sqrt{\alpha} y_{Tc_0})$ is on the twist of the elliptic curve, the message point $(x_{m_0}, \sqrt{\alpha} y_{m_0})$ is computed as $(x_{m_0}, \sqrt{\alpha} y_{m_0}) = (x_{Tc_0}, \sqrt{\alpha} y_{Tc_0}) - (x_{TS_0}, \sqrt{\alpha} y_{TS_0})$ and $(x_{c_0}, y_{c_0}) = (x_{S_0}, y_{S_0})$;

(q) recovering the bit string of 0-th block $B_{m_0}$ from the x-coordinate of the point $(x_{m_0}, y_{m_0})$ if the message point is on the elliptic curve, wherein the secret message bit string of the 0-th block is recovered from the x-coordinate of the point $(x_{m_0}, \sqrt{\alpha} y_{m_0})$ if the message point is on the twist of the elliptic curve, and recovering the initial $N_m$ message bits from the bit string of $B_{m_0}$;

(r) setting i=0 and iteratively repeating the following steps s) through t) until i>u:

(s) computing the message point as $(x_{m_0}, y_{m_0}) = (x_{c_i}, y_{c_i}) - (x_{c_{i-1}}, y_{c_{i-1}})$ and $(x_{Tc_i}, \sqrt{\alpha} y_{Tc_i}) = (x_{Tc_{i-1}}, \sqrt{\alpha} y_{Tc_{i-1}})$ if the received cipher point of the i-th block $(x_{c_i}, y_{c_i})$ is on the elliptic curve, wherein if the received cipher point $(x_{Tc_i}, \sqrt{\alpha} y_{Tc_i})$ is on the twist of the elliptic curve, the message point $(x_{m_i}, \sqrt{\alpha} y_{m_i})$ is computed as $(x_{m_i}, \sqrt{\alpha} y_{m_i}) = (x_{Tc_i}, \sqrt{\alpha} y_{Tc_i}) - (x_{Tc_{i-1}}, \sqrt{\alpha} y_{Tc_{i-1}})$ and $(x_{c_i}, y_{c_i}) = (x_{c_{i-1}}, y_{c_{i-1}})$; and (t) recovering the bit string of i-th block $B_{m_i}$ from the x-coordinate of the point $(x_{m_i}, y_{m_i})$ if the message point is on the elliptic curve, wherein the secret message bit string of the i-th block is recovered from the x-coordinate of the point $(x_{m_i}, \sqrt{\alpha} y_{m_i})$ if the message point is on the twist of the elliptic curve, and recovering the $N_m$ message bits from the bit string of the i-th block $B_{m_i}$.

6. The computerized method of cipher block chaining using elliptic curve cryptography as recited in claim 5, wherein the step of embedding includes the steps of:

(a) dividing the message bit string into N-bit strings, wherein the i-th block is given by $m_i$;

(b) assigning the value of the bit string of $m_i$ to $x_{m_i}$;

(c) substituting the values of $x_{m_i}$ and computing a residue value $t_{m_i}$ as $t_{m_i} = x_{m_i}^3 + a x_{m_i} + b$, wherein if $t_{m_i}$ is quadratic residue such that $Y_{m_i} = \sqrt{t_{m_i}}$, then the message point is embedded as $(x_{m_i}, y_{m_i})$, and if $t_{m_i}$ is non-quadratic residue such that $$y_{m_i} = \sqrt{\frac{t_{m_i}}{\alpha}},$$

then the message point is embedded $(x_{m_i}, \sqrt{\alpha} y_{m_i})$.

* * * * *